US012204958B2

(12) United States Patent
Pitre et al.

(10) Patent No.: US 12,204,958 B2
(45) Date of Patent: Jan. 21, 2025

(54) FILE SYSTEM MANIPULATION USING MACHINE LEARNING

(71) Applicant: Affectiva, Inc., Boston, MA (US)

(72) Inventors: Boisy G. Pitre, Opelousas, LA (US);
Rana el Kaliouby, Milton, MA (US);
Youssef Kashef, Obour (EG)

(73) Assignee: Affectiva, Inc., Boston, MA (US)

( * ) Notice: Subject to any disclaimer, the term of this patent is extended or adjusted under 35 U.S.C. 154(b) by 1175 days.

(21) Appl. No.: 16/828,154

(22) Filed: Mar. 24, 2020

(65) Prior Publication Data
US 2020/0226012 A1    Jul. 16, 2020

Related U.S. Application Data

(63) Continuation-in-part of application No. 14/460,915, filed on Aug. 15, 2014, now abandoned, which is a
(Continued)

(51) Int. Cl.
*G06F 9/54* (2006.01)
*G06F 16/182* (2019.01)
(Continued)

(52) U.S. Cl.
CPC .......... *G06F 9/546* (2013.01); *G06F 16/1824* (2019.01); *G06N 5/04* (2013.01); *G06N 20/00* (2019.01); *G06V 40/174* (2022.01)

(58) Field of Classification Search
CPC ...... G06F 9/546; G06F 16/1824; G06F 16/55; G06F 9/54; G06N 5/04; G06N 20/00;
(Continued)

(56) References Cited

U.S. PATENT DOCUMENTS 3,034,500 A    5/1962    Backster, Jr.
3,548,806 A    12/1970   Fisher
(Continued)

FOREIGN PATENT DOCUMENTS

JP          08115367        7/1996
KR    10-2005-0021759 A    3/2005
(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Wesley J Tucker
(74) *Attorney, Agent, or Firm* — Adams Intellex, PLC

(57) ABSTRACT

File system manipulation using machine learning is described. Access to a machine learning system is obtained. A connection between a file system and an application is structured. The connection is managed through an application programming interface (API). The connection provides two-way data transfer through the API between the application and the file system. The connection provides distribution of one or more data files through the API. The connection provides enablement of processing of the one or more data files. The processing uses classifiers running on the machine learning system. Data files are retrieved from the file system connected through the interface. The file system is network-connected to the application through the interface. The data files comprise image data of one or more people. Cognitive state analysis is performed by the machine learning system. The application programming interface is generated by a software development kit (SDK).

25 Claims, 12 Drawing Sheets

Related U.S. Application Data continuation-in-part of application No. 13/153,745, filed on Jun. 6, 2011, now abandoned.

(60) Provisional application No. 62/955,493, filed on Dec. 31, 2019, provisional application No. 62/954,819, filed on Dec. 30, 2019, provisional application No. 62/954,833, filed on Dec. 30, 2019, provisional application No. 62/926,009, filed on Oct. 25, 2019, provisional application No. 62/925,990, filed on Oct. 25, 2019, provisional application No. 62/893,298, filed on Aug. 29, 2019, provisional application No. 62/827,088, filed on Mar. 31, 2019, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/867,007, filed on Aug. 16, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010.

(51) Int. Cl.
  *G06N 5/04* (2023.01)
  *G06N 20/00* (2019.01)
  *G06V 40/16* (2022.01)

(58) Field of Classification Search
  CPC ........ G06N 3/045; G06N 3/047; G06N 3/048; G06N 3/088; G06V 40/174
  See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,163,322 A * | 12/2000 | LaChapelle ............ G06F 3/011 345/473 |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 6,964,023 B2 * | 11/2005 | Maes .................... G06F 3/0481 704/E15.041 |
| 7,003,135 B2 | 2/2006 | Isieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |

(56) References Cited

U.S. PATENT DOCUMENTS

| | | | |
|---|---|---|---|
| 7,921,036 B1 | 4/2011 | Sharma | |
| 8,010,458 B2 | 8/2011 | Galbreath et al. | |
| 8,022,831 B1 | 9/2011 | Wood-Eyre | |
| 8,219,438 B1 | 7/2012 | Moon et al. | |
| 8,401,248 B1 | 3/2013 | Moon et al. | |
| 8,442,638 B2 | 5/2013 | Libbus et al. | |
| 8,522,779 B2 | 9/2013 | Lee et al. | |
| 8,600,120 B2 | 12/2013 | Gonion et al. | |
| 8,640,021 B2 | 1/2014 | Perez et al. | |
| 9,959,627 B2* | 5/2018 | Smolyanskiy | G06T 17/00 |
| 10,322,728 B1 | 6/2019 | Porikli et al. | |
| 10,628,985 B2* | 4/2020 | Mishra | G06V 40/174 |
| 11,915,513 B2* | 2/2024 | Kang | G06V 40/161 |
| 2001/0033286 A1 | 10/2001 | Stokes et al. | |
| 2001/0041021 A1 | 11/2001 | Boyle et al. | |
| 2002/0007249 A1 | 1/2002 | Cranley | |
| 2002/0030665 A1 | 3/2002 | Ano | |
| 2002/0042557 A1 | 4/2002 | Bensen et al. | |
| 2002/0054174 A1 | 5/2002 | Abbott et al. | |
| 2002/0084902 A1 | 7/2002 | Zadrozny et al. | |
| 2002/0171551 A1 | 11/2002 | Eshelman | |
| 2002/0182574 A1 | 12/2002 | Freer | |
| 2003/0035567 A1 | 2/2003 | Chang et al. | |
| 2003/0037041 A1 | 2/2003 | Hertz | |
| 2003/0043153 A1* | 3/2003 | Buddemeier | G06T 13/40 345/473 |
| 2003/0060728 A1 | 3/2003 | Mandigo | |
| 2003/0093784 A1 | 5/2003 | Dimitrova et al. | |
| 2003/0182123 A1 | 9/2003 | Mitsuyoshi | |
| 2003/0191682 A1 | 10/2003 | Shepard et al. | |
| 2003/0191816 A1 | 10/2003 | Landress et al. | |
| 2004/0181457 A1 | 9/2004 | Biebesheimer | |
| 2005/0078124 A1* | 4/2005 | Liu | G06T 13/40 345/629 |
| 2005/0165758 A1 | 7/2005 | Kasten | |
| 2005/0187437 A1* | 8/2005 | Matsugu | A61B 5/16 128/920 |
| 2005/0283055 A1 | 12/2005 | Shirai et al. | |
| 2005/0289582 A1 | 12/2005 | Tavares et al. | |
| 2006/0019224 A1 | 1/2006 | Behar et al. | |
| 2006/0107323 A1* | 5/2006 | McLean | G06F 21/46 726/23 |
| 2006/0143647 A1 | 6/2006 | Bill | |
| 2006/0170945 A1 | 8/2006 | Bill | |
| 2006/0234730 A1* | 10/2006 | Bibr | H04L 69/08 455/552.1 |
| 2006/0235753 A1 | 10/2006 | Kameyama | |
| 2007/0167689 A1 | 7/2007 | Ramadas et al. | |
| 2007/0173733 A1* | 7/2007 | Le | A61B 5/369 600/544 |
| 2007/0239787 A1 | 10/2007 | Cunningham et al. | |
| 2007/0255831 A1 | 11/2007 | Hayashi et al. | |
| 2007/0265507 A1 | 11/2007 | de Lemos | |
| 2007/0299964 A1 | 12/2007 | Wong et al. | |
| 2008/0059570 A1 | 3/2008 | Bill | |
| 2008/0091512 A1 | 4/2008 | Marci et al. | |
| 2008/0091515 A1 | 4/2008 | Thieberger et al. | |
| 2008/0101660 A1 | 5/2008 | Seo | |
| 2008/0103784 A1 | 5/2008 | Wong et al. | |
| 2008/0167757 A1 | 7/2008 | Kanevsky et al. | |
| 2008/0184170 A1 | 7/2008 | Periyalwar | |
| 2008/0201144 A1 | 8/2008 | Song et al. | |
| 2008/0208015 A1 | 8/2008 | Morris et al. | |
| 2008/0221472 A1 | 9/2008 | Lee et al. | |
| 2008/0287821 A1 | 11/2008 | Jung et al. | |
| 2008/0292151 A1 | 11/2008 | Kurtz et al. | |
| 2008/0319276 A1 | 12/2008 | Jung | |
| 2009/0002178 A1* | 1/2009 | Guday | A61B 5/0002 340/573.1 |
| 2009/0002479 A1 | 1/2009 | Sangberg | |
| 2009/0006206 A1 | 1/2009 | Groe | |
| 2009/0083421 A1 | 3/2009 | Glommen et al. | |
| 2009/0094286 A1 | 4/2009 | Lee et al. | |
| 2009/0112694 A1 | 4/2009 | Jung et al. | |
| 2009/0112810 A1 | 4/2009 | Jung et al. | |
| 2009/0133048 A1 | 5/2009 | Gibbs et al. | |
| 2009/0150919 A1 | 6/2009 | Lee et al. | |
| 2009/0156907 A1 | 6/2009 | Jung et al. | |
| 2009/0164132 A1 | 6/2009 | Jung et al. | |
| 2009/0193344 A1 | 7/2009 | Smyers | |
| 2009/0210290 A1 | 8/2009 | Elliott et al. | |
| 2009/0217315 A1 | 8/2009 | Malik et al. | |
| 2009/0259518 A1 | 10/2009 | Harvey | |
| 2009/0270170 A1 | 10/2009 | Patton | |
| 2009/0271417 A1 | 10/2009 | Toebes et al. | |
| 2009/0285456 A1* | 11/2009 | Moon | G06V 40/176 382/118 |
| 2009/0299840 A1 | 12/2009 | Smith | |
| 2010/0070523 A1 | 3/2010 | Delgo et al. | |
| 2010/0086215 A1 | 4/2010 | Bartlett et al. | |
| 2010/0099955 A1 | 4/2010 | Thomas et al. | |
| 2010/0266213 A1 | 10/2010 | Hill | |
| 2010/0274847 A1 | 10/2010 | Anderson et al. | |
| 2010/0324437 A1 | 12/2010 | Freeman | |
| 2011/0007174 A1 | 1/2011 | Bacivarov et al. | |
| 2011/0126226 A1 | 5/2011 | Makhlouf | |
| 2011/0134026 A1 | 6/2011 | Kang et al. | |
| 2011/0143728 A1 | 6/2011 | Holopainen et al. | |
| 2011/0144971 A1 | 6/2011 | Danielson | |
| 2011/0161912 A1 | 6/2011 | Eteminan | |
| 2011/0196855 A1 | 8/2011 | Wable et al. | |
| 2011/0197123 A1 | 8/2011 | Caine et al. | |
| 2011/0231240 A1 | 9/2011 | Schoen et al. | |
| 2011/0251493 A1 | 10/2011 | Poh et al. | |
| 2011/0263946 A1 | 10/2011 | el Kaliouby et al. | |
| 2012/0271484 A1 | 10/2012 | Feit et al. | |
| 2012/0324491 A1 | 12/2012 | Bathiche et al. | |
| 2013/0023337 A1 | 1/2013 | Bowers et al. | |
| 2013/0116587 A1 | 5/2013 | Sommo et al. | |
| 2013/0197409 A1 | 8/2013 | Baxter et al. | |
| 2014/0172910 A1 | 6/2014 | Jung et al. | |
| 2014/0276090 A1 | 9/2014 | Breed | |
| 2016/0104486 A1 | 4/2016 | Penilla et al. | |
| 2017/0003784 A1 | 1/2017 | Garg et al. | |
| 2017/0297587 A1 | 10/2017 | Mimura et al. | |
| 2018/0050696 A1 | 2/2018 | Misu et al. | |
| 2018/0124458 A1* | 5/2018 | Knox | H04N 21/4223 |
| 2018/0251122 A1 | 9/2018 | Golston et al. | |
| 2019/0049965 A1 | 2/2019 | Tanriover | |
| 2019/0135325 A1 | 5/2019 | Lisseman et al. | |
| 2019/0172243 A1* | 6/2019 | Mishra | G10L 15/005 |
| 2019/0225232 A1 | 7/2019 | Blau | |
| 2019/0285881 A1* | 9/2019 | Ilic | G06T 19/006 |
| 2019/0325633 A1* | 10/2019 | Miller, IV | G06V 40/18 |
| 2020/0051303 A1* | 2/2020 | Li | G06N 3/045 |
| 2020/0103980 A1 | 4/2020 | Katz et al. | |
| 2020/0171977 A1 | 6/2020 | Jales Costa et al. | |
| 2020/0223362 A1 | 7/2020 | Witte | |
| 2020/0285871 A1 | 9/2020 | Tokizaki et al. | |
| 2020/0130528 A1 | 10/2020 | Upmanue et al. | |
| 2021/0056747 A1* | 2/2021 | Hefny | G06T 17/20 |
| 2023/0222314 A1* | 7/2023 | Alford | G06F 16/2219 706/11 |
| 2024/0013462 A1* | 1/2024 | Seol | G06T 13/40 |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

(56) References Cited

OTHER PUBLICATIONS

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.
Nicholas R. Howe and Amanda Ricketson, Improving the Boosted Correlogram, 2004, Lecture Notes in Computer Science, ISSN 0302-9743, Springer-Verlag, Germany.
Xuming He, et al., Learning and Incorporating Top-Down Cues in Image Segmentation, 2006, Lecture Notes in Computer Science, ISBN 978-3-540-33832-1, Springer-Verlag, Germany.
Ross Eaton, et al., Rapid Training of Image Classifiers through Adaptive, Multi-frame Sampling Methods, Oct. 2008, IEEE 37th Applied Imagery Pattern Recognition Workshop, Washington DC.
Verkruysse, Wim, Lars O. Svaasand, and J. Stuart Nelson. "Remote plethysmographic imaging using ambient light." Optics express 16.26 (2008): 21434-21445.
Albiol, Alberto, et al. "Face recognition using HOG-EBGM." Pattern Recognition Letters 29.10 (2008): 1537-1543.
Fasel, B. (Aug. 2002). Robust face analysis using convolutional neural networks. In Object recognition supported by user interaction for service robots (vol. 2, pp. 40-43). IEEE.
Matsugu, M., Mori, K., Mitari, Y., & Kaneda, Y. (2003). Subject independent facial expression recognition with robust face detection using a convolutional neural network. Neural Networks, 16(5-6), 555-559.

\* cited by examiner

FILE SYSTEM MANIPULATION USING MACHINE LEARNING

RELATED APPLICATIONS

This application claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

This application is also a continuation-in-part of U.S. patent application "Mental State Analysis Using An Application Programming Interface" Ser. No. 14/460,915, filed Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The application "Mental State Analysis Using An Application Programming Interface" Ser. No. 14/460,915, filed Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF ART

This application relates generally to file system manipulation and more particularly to file system manipulation using machine learning.

BACKGROUND

The wide-ranging types and capabilities of computer systems that are available today require software developed according to various, and at times disparate, standards. Modern software is highly complex and includes numerous operations, features, and user-selectable options. Software systems frequently contain hundreds of thousands to millions of lines of code, or for some software systems, even more lines of code. The direct result is that software development has become a critical worldwide industry that demands key skills. This industry continues to rapidly expand, resulting in a host of companies continuously developing new products, improving feature sets, and frequently updating their respective software products. The software systems that are developed are grouped into broad categories, where the categories are based on the intended uses of the software. Examples of software categorized by type include: systems software, including operating systems; utility software for monitoring and configuring computer systems; device drivers for controlling and operating attached peripherals such as disks and displays; graphical user interfaces for improving the human-computer interface, etc.; compilers for assembly, procedural, scripting, and object-orientated programming languages; and applications software, to name but a few. Each software type addresses a broad range of potential software uses within a specific category. Application software addresses such diverse purposes as enterprise software, security software, and industry-specific software. Enterprise software includes products for asset management and customer relationship management, in addition to purpose-built codes for financial institutions, travel agencies and booking agents, telecommunications companies, healthcare applications, retail stores, and others. Software developers must produce their codes cost-effectively and efficiently due in part to the complexity and development costs of these and other software systems.

Software is developed using a wide range of engineering and productivity models. Software developers can choose to build their software from a conglomeration of code, often choosing to obtain code modules from a variety of sources and vendors rather than developing their codes entirely in-house. And, in turn, the code developed by an organization is often offered to and purchased by both other software developers and end users or customers. Obtaining previously written code modules can simplify the process of code development across many sectors. For example, a developer of code for a medical application can choose to concentrate on effectively and efficiently coding the complexities of an image processing algorithm and can opt to purchase code to handle other tasks such as data acquisition and storage, wireless sensing and communication, graphical user interfaces, etc. Thus, such modular code and the completed code containing modular elements must function properly, be stable and reliable, and be easily maintained. The software modules sold by software producers are meticulously designed so that purchasers of the software are able to easily integrate the modules into their products and systems. The purchasers, in turn, often sell their software products and services to other purchasers who continue the integration process.

The software, whether developed entirely in-house, integrated with software systems from other developers, or purchased as a "turnkey" system, handles data. The data, whether it is read from sensors, purchased from an aggregator, or maintained by an enterprise such as a hospital or school, is generally stored. The stored data can then be read for processing or analysis by software, rented or sold to other enterprises, or maintained as a collection of data, among other applications. The amount of data that is stored can be immense. Application data storage requirements ranging beyond petabytes, exabytes, or more, are becoming common. Handling of so much data would be impossible without imposing some kind of structure onto the data. Thus, rather than storing the data as one large mass of data, the data is stored in files. However, storing smaller amounts data as files is not in itself sufficient for enabling efficient access to the data. The files are themselves organized into structures called file systems. A file system provides techniques for naming files and standards for creating, organizing, and accessing the files. Files that have some kind of a relationship, such as a common source, purpose, or owner, can be grouped into folders or directories. Groups of folders can also be grouped, and so on, enabling further organization of the access to the data. Many file systems are readily available to computer users, software developers, and enterprises. In fact, file systems are provided with common operating systems such as Windows™, MacOS™, UNIX™, Linux™, among others.

SUMMARY

File system manipulation using machine learning is described. Access to a machine learning system is obtained. A connection between a file system and an application is structured. The connection is managed through an application programming interface (API). The connection provides two-way data transfer through the API between the application and the file system. The connection provides distribution of one or more data files through the API. The connection provides enablement of processing of the one or more data files. The processing uses classifiers running on the machine learning system. Data files are retrieved from the file system connected through the interface. The file system is network-connected to the application through the interface. The data files comprise image data of one or more people. Cognitive state analysis is performed by the machine learning system. The application programming interface is generated by a software development kit (SDK).

A computer-implemented method for file system manipulation is disclosed comprising: accessing a machine learning system; structuring a connection between a file system and an application, wherein the connection is managed through an application programming interface (API), wherein the connection that is structured provides: two-way data transfer through the API between the application and the file system; distribution of one or more data files through the API; and enablement of processing of the one or more data files, using classifiers running on the machine learning system, wherein the one or more data files comprise images of an individual; determining cognitive state data based on the processing of the one or more data files; and outputting a result from the determining, through the connection that was structured. In embodiments, the one or more data files comprise images of an individual. Some embodiments comprise determining cognitive state data based on the result from the at least one of the classifiers. Other embodiments comprise analyzing the cognitive state data to produce cognitive state information. Still other embodiments comprise receiving a connection request through the interface for images and mental, emotional, or cognitive state information. In embodiments, the connection request comes from a peer component.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
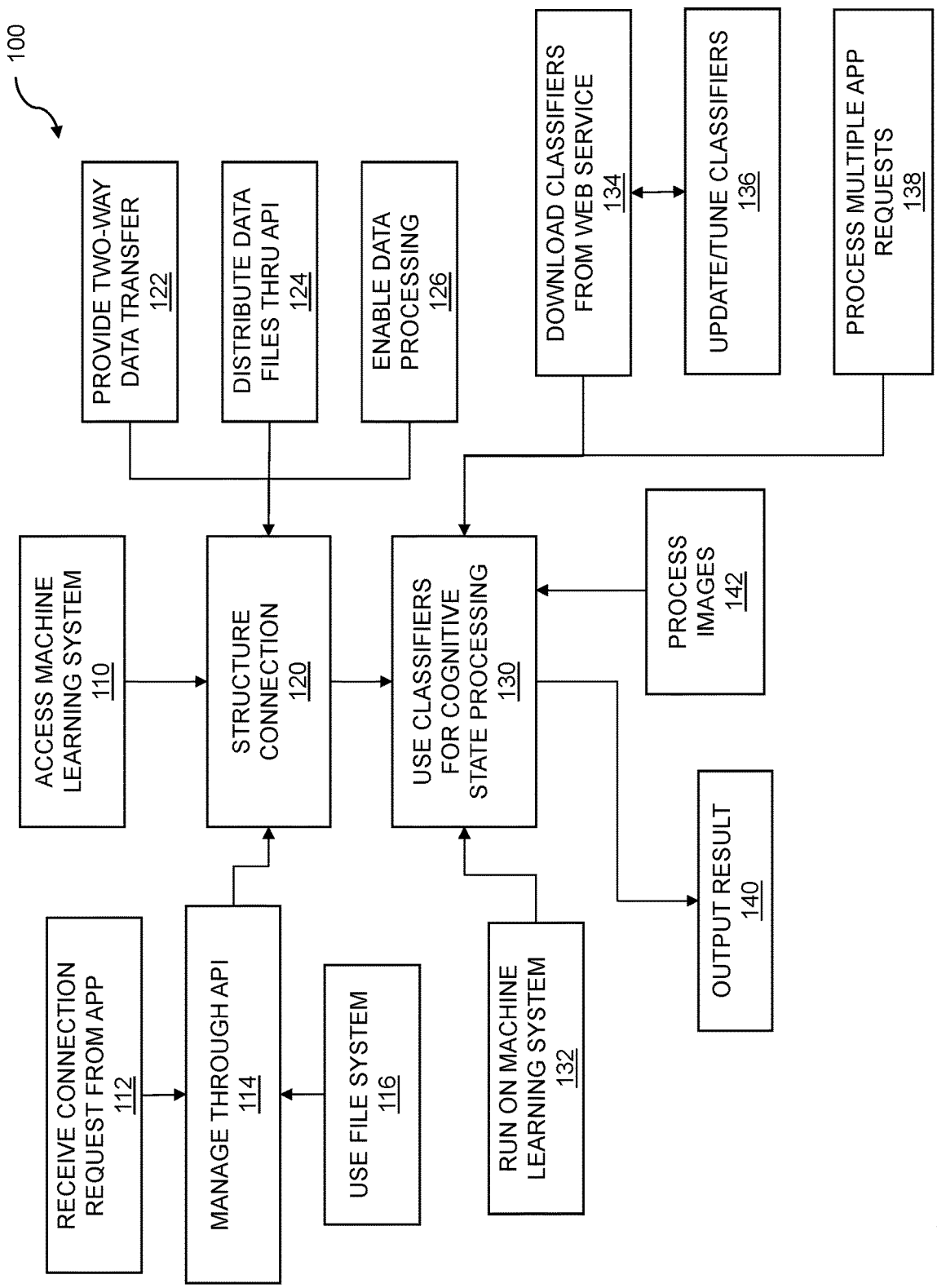
FIG. 1 is a flow diagram for an API for file system integration into a machine learning system.

Assessment of individual emotional reactions to life events, media presentations, and communication with other people, to name a few, has become ubiquitous in our modern, social-media saturated society. From the moment a person wakes to the moment they go to bed, the opportunities for assessing, self-quantifying, and sharing emotional reactions to even the most mundane of daily activities are abundant. For example, social media sites such as Facebook™, Digg™, and Google+™ among others, allow a person to instantly and broadly share his or her emotional reaction to a meal at a restaurant, the view from the upper floor of a building, his or her partner returning from a trip, among numerous other situations. With the ubiquitous nature of smartphones and web-connected devices such as tablets, cameras, and even watches and other ultra-portable wearable devices, the opportunities to share emotional reactions are staggering.

Yet, even with the numerous opportunities to share mental state information, perhaps the most significant barrier to a person's ability to share his or her mental state remains the difficulty and time-consuming nature of self-accessing emotional reactions to life events, media, and other emotionally charged situations. Disclosed below are concepts which describe file system manipulation using machine learning. A file system provides the framework for an application programming interface (API) to provide a reliable way to evaluate and communicate an accurate representation of a user's mental, emotional, or cognitive state by enabling a device to employ various classifiers for data file processing. Applications can call the API, send information to the API (including video or images), and receive machine learning-based analysis sent back from the API, all of which leverage the file system. In embodiments, the applications are referred to as apps. In embodiments, image data files are analyzed to produce cognitive state information. In embodiments, the image data files are augmented with audio data files. In embodiments, a machine learning-based classifier engine processes the cognitive state information to provide an output to the app in use, within the framework of the file system and API.

The disclosed file system and API for emotionally enabling devices allows for unconscious analysis of facial expressions, body language, and other corporeal reactions in much the same way that a friend might analyze a person's mental state quickly, and with minimum conscious effort. Using advanced classifiers in concert with the cameras or other imaging devices present in the vast majority of internet-connected personal electronic devices such as smartphones and tablets, the disclosed API allows images of a person to be effectively analyzed and rendered as pertinent, sharable information. For example, the API can work in concert with a smartphone operating system to employ images or videos obtained from a front-facing camera of a user's smartphone to analyze the person's emotional state while watching or after finishing a YouTube™ video or another media presentation. The smartphone could use the disclosed API in combination with various applications in order to obtain images and then evaluate a user's mental state. The user's mental state can then be used by the app to evaluate different aspects of the user's mental response based on the app's intended function. If it is determined that the user had a negative emotional reaction to the media, the user can be presented with a dialogue asking whether the user wants to share his or her reaction with other people. For example, the sharing can comprise a pre-composed image containing an image of the user at the height of his or her emotional response placed beside or above an image of a specific point in the media and captioned: "'User X' did not enjoy watching 'video title.'" In this manner, the user is presented with a convenient and accurate way to share his or her response to media. In the same manner, the user's smartphone or tablet camera can capture images of the user as the user performs daily tasks such as checking email, using online banking, and logging exercise or daily food consumption. Using the API and classifiers, an app on the system can analyze such images and can determine at what point during the day the user had the most positive emotional response. The app could then present the user with a dialogue first asking "Were you browsing 'x' website at 2:34 p.m.?" If the user answers in the affirmative, another dialogue might ask "Would you like to share the following image on a social media site?" accompanied by a pre-composed image of the user at the height of his or her emotional response and a caption such as, "'X user' was happiest today when 'X user' was browsing 'Y website' at 2:34 p.m." The app can also listen for a specific emotional event, and when the event is detected, can use the API to perform analysis on images in order to create usable mental state information.

Thus, a user's personal electronic device can be emotionally enabled, with the file system and API allowing for both the efficient transfer of mental state information between applications and the effective analysis of images. Apps or other user interfaces on the device can then use the mental state information acquired through the transfer to conveniently present individuals with various opportunities to fluidly and intuitively share and understand personal moods, emotions, and emotional states. As an effect of the ability to present the user with his or her own emotional states, the user avoids the cumbersome and often overwhelming task of subjectively analyzing and vocalizing emotional states and moods.

To facilitate the generation of mental state data, images of one or more individuals whose mental states are sought are collected. In embodiments, images of people posting to social networks, who desire to share their mental states with other social network users, can be collected. The images are analyzed using one or more classifiers that are obtained from a web service. The image capture can be performed using a variety of imaging devices, including cameras on portable devices, cameras on stationary devices, and standalone cameras, provided that the imaging devices are accessible through a software interface on the emotionally-enabled personal electronic device or devices. Additionally, the interface also allows some or all processing of the images to be performed locally on the device instead of sending the images for analysis, depending on the processing, storage, and communication capabilities of the device.

Having obtained one or more images of an individual through a software interface on a device, an evaluation of the images is performed. Similarly, one or more images can be obtained from a plurality of people using software interfaces on one or more devices. The image evaluations provide insight into the mental states of the users. All or part of the image evaluation can take place on a portable device. Through evaluation, many different mental states can be determined, including frustration, confusion, disappointment, hesitation, cognitive overload, focusing, engagement, attention, boredom, exploration, confidence, trust, delight, disgust, skepticism, doubt, satisfaction, excitement, laughter, calmness, stress, and curiosity. Other mental states can be determined through similar evaluation.

Cognitive state, mental state, and/or emotional state information of an individual or plurality of individuals is output through the API on the device. The output can include text, figures, images, video, and other data relating to the mental state or states of the individuals whose images were analyzed. The mental states can be rendered on a social network for sharing with other users of the social network. A user posting a message or image to a social network can choose to include additional information with the posting, including the rendering of his or her mental state or states. The posting of a representation of an analyzed mental state of the user provides viewers of the post with a keen insight into the mental state of the user at the time of the posting. Emotional state, mental state, cognitive state, and so on, are terms of art which may connote slight differences of emphasis, for example an emotional state of "happiness" vs. a cognitive state of "distractedness," but at a high level, the terms can be used interchangeably. In fact, because the human mind of an individual is often difficult to understand, even for the individual, emotional, mental, and cognitive states may easily be overlapping and appropriately used in a general sense.

FIG. 1 is a flow diagram for an API for file system integration into a machine learning system. The flow 100 that describes a computer-implemented method for file system manipulation is shown. The flow 100 includes accessing a machine learning system 110. The machine learning system, or deep learning system, can be used for file system manipulation. The data files that are contained in the file system can be any number of different data files, including images of an individual. The images can be obtained through a mobile device or any other device suitable for image capture and can be stored on the file system for later use or consumed by the machine learning system in a real time or near real time manner. The images can be obtained through a software application programming interface, which can be accomplished by accessing software on a device. In embodiments, the images are collected from a video of the individual. The images can be collected to evaluate mental state information. The device can be a portable device equipped with a camera. The device can be a smartphone, PDA, tablet, laptop, or any other portable device. The camera can be built into the device, connected to the device wirelessly or with a tether, and so on. Image data can be captured by using any type of image-capture device including a webcam, a video camera, a still camera, a thermal imager, a CCD device, a phone camera, a three-dimensional camera, a light field camera, multiple cameras to obtain different aspects or views of a person, or any other type of image capture technique that allows captured data to be used in an electronic system.

The software interface can be an app on the portable device. The app can be one or more of many apps on a portable device, where the apps can be installed by default on the portable device, can be installed by the user of the device, and so on. The software interface includes an application programming interface (API). The API can permit both developers and users alike to access the device and to develop apps for the device. Access to the device can allow for running of programs, setting of default values, controlling attached devices, gathering data from attached devices such as cameras, and so on. In embodiments, the API is generated by a software development kit (SDK). The SDK can be executed on the portable device or can be executed on a separate computer system such as a tablet, a laptop, a desktop, a workstation, a mainframe, or any other appropriate computer system. In embodiments, the SDK runs on a different system from the device. The SDK can be used to generate any type of app for the portable device. In embodiments, the software development kit is specifically designed to develop apps for the device to be emotionally enabled. In other embodiments, the SDK is for a family of devices, such as a class of tablets or smartphones running a certain operating system; multiple devices, such as a SDK able to develop cross-platform apps; and so on.

The flow 100 continues by receiving a connection request from an application 112 through the software interface for the images and the mental state information. The request can originate from an action initiated by the user such as starting an app, scheduling an app, pressing a button on a device display, pressing a physical button, and so on. The request can come from a system, an application, or a program running on a remote processor. For example, a request for an image and mental state can come from a social networking site. In embodiments, the connection request comes from a peer component, i.e. a component accessed independently of an external network connection. A peer component can be a hardware component or a software component. The peer component can make a request as a result of an action taken by a user or can result from a request originating externally to the device. In embodiments, the peer component is also running on the same device as the API. The peer component can be a component of the operating system on the device, or can be added by a user or by another application.

The flow 100 continues with structuring a connection 120 between a file system and the application. The connection is managed through the API 114 for the connection request, where the connection data structure can describe a format for the images. To facilitate image transmittal and processing, an app requesting an image must know where and in what format the image is stored. The data connection structure can allow an app to define an access route to an image from the app, through the API managed data structure, to data located within a file system 116 or other data source. For example, the accessing of the image can take a path that includes direct access to a camera or other image capture device. The data structure can include an appropriate number of fields necessary to describe the image. The data structure can also provide key information about the potentially accessed image, including number of bytes in the image, byte order, image encoding format such as TIFF or JPEG, image name, GPS coordinates, and so on. Following the same access pattern, the flow 100 also includes receiving a connection data structure for the connection request where the connection data structure provides two-way data transfer 122 between the application and the file system. The data files can be distributed through the API 124. The connection data structure can enable data processing 126, as described below. The data structure can provide a path by which an app or another system request can access and use mental state information. Ready access to mental state information, along with format data for the mental state information, means that using a data structure can greatly simplify the process of integrating mental state information into the function of an app or device.

The flow 100 includes using classifiers for cognitive state processing 130 to process and analyze data files being routed between the application and the file system through the API. The analyzing is based on one or more classifiers, for example, which can process cognitive state data based on conformity to certain criteria, based on machine learning, based on machine learning using a neural network, based on deep learning, and so on, in order to produce cognitive state information. Any number of classifiers appropriate to the analysis can be used. The classifiers can be obtained by a variety of techniques. The flow 100 continues with downloading the one or more classifiers from a web service 134, but the classifiers can also be obtained by a variety of other techniques including an ftp site, a social networking page, and so on. In embodiments, the one or more classifiers for downloading are based on one or more of processing capability of the device, bandwidth capability for the device, and an amount of available memory on the device, allowing classifiers appropriate to the capabilities of the device to be downloaded. For example, if the device has a relatively low computational capability, simple classifiers can be downloaded to start the processing. The flow 100 further comprises updating one or more of the classifiers 136 or in some cases tuning the one or more classifiers 136, based on improvements to the one or more classifiers in cloud storage. The classifiers can be tuned or updated based on a number of factors, including real-time performance evaluation obtained from the device. By updating or tuning the classifiers, improved accuracy of mental state analysis can be achieved without updating the app or the API. Further, there is no need to compile or relink any of the program code. The classifiers can be run on a machine learning system 132. The machine learning system can be used for file manipulation using an API.

In certain embodiments, it is useful to process multiple application requests 138. The multiple requests can be from multiple devices. The processing of multiple requests can be used, for example, for classifying mental state data from multiple devices to provide a more thorough view of an individual's or group of individuals' mental states than would be possible using only one source of mental state data. Again, by way of example, building a timeline of mental state data by assembling mental state data from multiple devices can create a more complete set of mental state data across the timeline. At points along the timeline, mental state data might be available from multiple sources. At those points, the best or most useful mental state data can be selected. The utility of mental state data can be determined by various factors, including assigning the highest rank to data from the camera with the most direct view of the individual or by using other criteria. In some cases, the mental state data can be combined, such as by averaging the mental state data. In other cases, the multiple pieces of mental state data can be retained so that later mental state analysis can use each of the pieces of data. Thus, assembling mental state data from multiple devices can improve mental state data coverage, aid in ensuring the accuracy of mental state data, and improve long-term usefulness of a particular set of data by allowing a more nuanced re-evaluation of the data at a later time. Some embodiments comprise connecting to multiple applications in order to process data files from the multiple applications. In some embodiments, the multiple applications are each running on different devices.

The flow 100 also includes outputting the result 140 from the machine learning system running the classifiers, using the connection data structure managed by the API. The result can include a connection data structure that describes a format for the images, and a connection data structure that describes the format for the mental state information. The mental state information can be used to infer one or more mental states of the user whose image is obtained. The mental state information which is output can be used to determine smiles, project sales, determine expressiveness, analyze media, monitor wellbeing, evaluate blink rate, evaluate heart rate, evaluate humor, and post to a social network. The outputting can include displaying images, text, emoticons, special icons, special images, and any other output format which is able to represent the one or more mental states. The posting of mental state can include posting to one or more social networks. The social networks can include social networks to which the user is subscribed. Further, mental states can be inferred for a plurality of people. When mental states can be inferred for a plurality of people, the plurality of people can share the mental states on social networks. The plurality of people can be in one or more social networks. The mental states can be shared with all members of a social network, some members of a social network, a specific group of members of a social network, and so on. In embodiments, the machine learning enables inferring cognitive states from data files processed by the classifiers.

The flow 100 includes processing images 142 to determine mental state data. The evaluation of the images can include machine learning techniques, using classifiers that have been downloaded. The evaluating can include searching the images for key facial features or pointers that can be used to determine mental state data. The mental state data can include facial expressions, general facial expressiveness, changes in facial expression, and so on. Facial pointers can include a smile, a frown, a measure of eyebrow raises, and so on. In some embodiments, one or more apps run in the background and images continue to be evaluated for mental state analysis even when the apps are not being displayed or are not running in the foreground of a device. In embodiments, the mental state data can be determined as a result of a user initiating an app, an app running on a schedule, a button press, and so on. In embodiments, the mental state data is collected sporadically. The collection of mental state data can be dependent on the location of the user's device, time of day, day of week, and so on. The sporadic collection can be due to the bandwidth capability of the device, changes in or intermittent connectivity, and so on. The resulting mental state information can be analyzed to infer mental states. The mental states include one or more of stress, sadness, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, and curiosity, among other mental states. In embodiments, the software interface makes available, or exposes, one or more analyzing functions for the mental state data. Any number of analyzing functions appropriate for analysis of mental state data can be used.

Additionally, the processing of images 142 can include processing images for a plurality of people. The images of the plurality of people can be used to determine mental state analysis of an individual within the plurality of people. Facial analysis can be used to identify the individual within the plurality of people. Additionally, mental state data captured on the individual can be correlated with mental state data captured on both the individual and plurality of other people simultaneously to aid in inferring mental states for the individual. As is the case for the single user described above, one or more devices can be used for the capture of the images. The devices can include one or more mobile devices or any other device or devices suitable for image capture. The images can be obtained through a software interface. The obtaining through the software interface can be accomplished by accessing software on a device. The images can be collected from one or more videos of the plurality of users. The one or more devices can be portable devices equipped with cameras. The devices can be smartphones, PDAs, tablets, laptops, or any other portable devices. The one or more cameras can be built into the one or more devices, connected to the devices wirelessly or with tethers, and so on. Image data can be captured by using any type of image-capture device or combination of devices including a webcam, a video camera, a still camera, a thermal imager, a CCD device, a phone camera, a three-dimensional camera, a light field camera, multiple cameras to obtain different aspects or views of a plurality of people, or any other type of image capture technique that can allow captured data to be used in an electronic system.

In other embodiments, the images processed for a plurality of people can be used to determine mental state data for the plurality of people, rather than just the individual within the plurality of people. As with evaluating images from a single individual, key facial features or pointers that can be used to determine mental state data can be extracted for the plurality of people. The mental state data can include facial expression, general facial expressiveness, changes in facial expression, and so on. Facial pointers can include a smile, a frown, eyebrow raises, and so on. As was the case for mental states inferred from an individual, the mental state information for the plurality of people can be output as a result 140 through the software interface.

The result that is output for either the plurality of people based on the mental state data for the plurality of people or for an individual within the plurality of people can be used to infer one or more mental states. The mental states can include one or more of frustration, confusion, disappointment, hesitation, cognitive overload, focusing, engagement, attention, boredom, exploration, confidence, trust, delight, disgust, skepticism, doubt, satisfaction, excitement, laughter, calmness, stress, and curiosity. As was the case for the analysis of mental state data for a single user, a variety of analysis techniques can be used, including analysis performed using a software interface or another appropriate analysis method. The analyzing can be based on one or more classifiers that can be downloaded from a web service. As with mental state data for an individual, mental state data from multiple devices can be assembled to aid in analyzing mental state data for the plurality of people. The devices which can produce mental state data on the plurality of people include one or more of a webcam, a video camera, a still camera, a thermal imager, a CCD, a phone camera, a three-dimensional camera, a light field camera, multiple cameras or sensors, or any other type of image capture technique that can allow captured data to be used in an electronic system.

Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
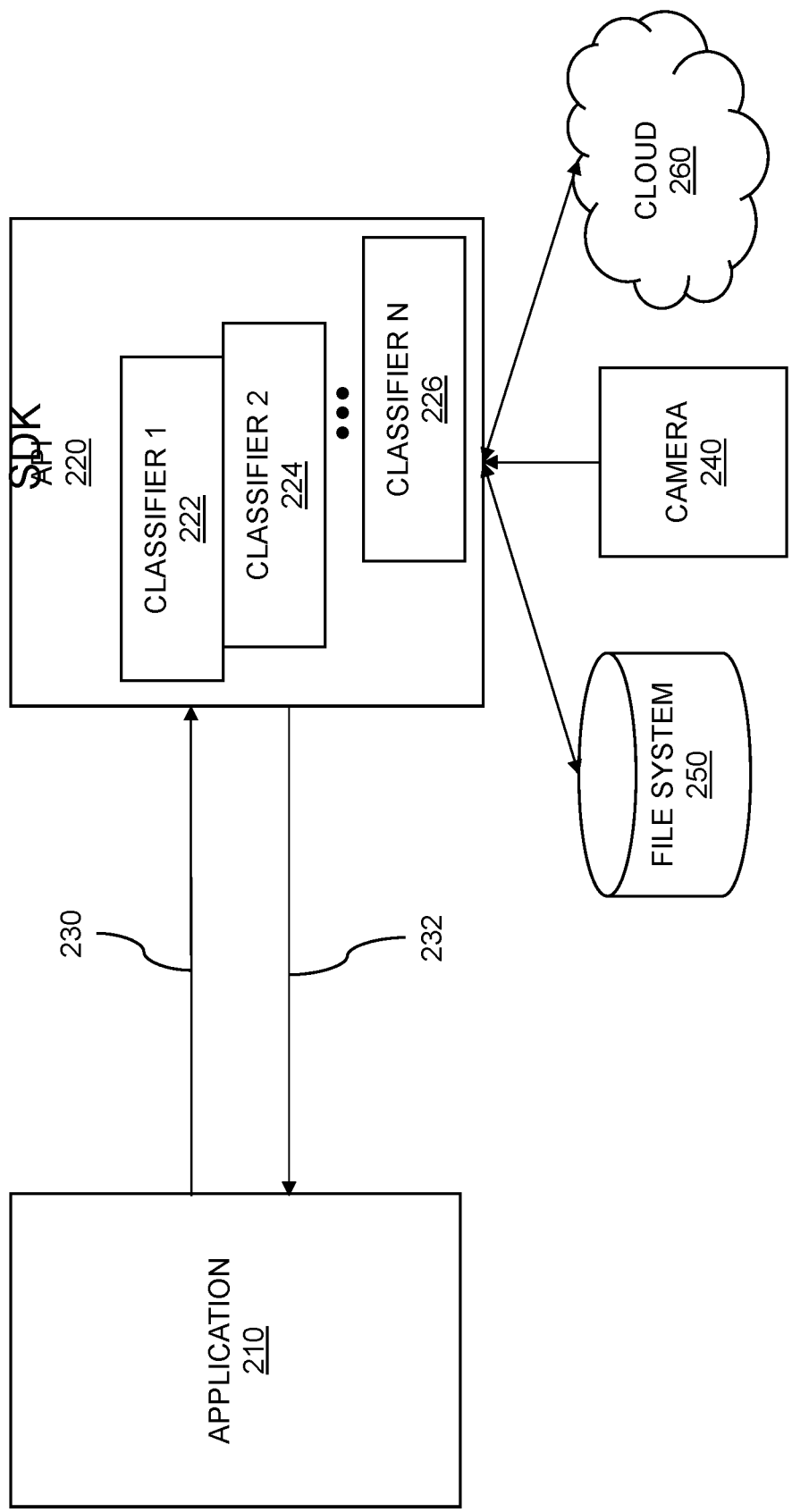
FIG. 2 is an example API with classifiers.

FIG. 2 is a diagram of an example API using classifiers. The API can enable file system manipulation using machine learning classifiers. An application 210, or app, loaded onto a device is shown. Any number of apps can be loaded or can be running on the device. The app can be a social networking app, such as Facebook™, Digg™, Google+™, LinkedIn™, Tumblr™, and so on. Numerous other types of apps can likewise utilize emotional enablement. Emotional enablement of an app can allow a user to automatically express his or her emotions while using the app. The device running the app can be any of a range of devices including portable devices such as laptop computers and ultra-mobile PCs, mobile devices such as tablets and smartphones, wearable devices such as glasses and wristwatches, and so on. In many cases, the devices contain built-in cameras, but some devices might employ external cameras connected to the device, accessible by the device, and so on.

In the example shown, an application 210 communicates through an API 220 which allows for emotionally enabling the application. In some embodiments, the API 220 is generated by a software development kit or SDK. The API 220 shown includes multiple classifiers to process mental state data and infer mental states. The mental states can include one or more of stress, sadness, anger, happiness, frustration, confusion, disappointment, hesitation, cognitive overload, focusing, engagement, attention, boredom, exploration, confidence, trust, delight, disgust, skepticism, doubt, satisfaction, excitement, laughter, calmness, and curiosity. One or more mental states can be analyzed to determine emotional states, moods, and other useful information which can prove difficult for an individual to self-identify. In embodiments, one or more classifiers are present in an API. In the figure, three example classifiers are shown, classifier 1 222, classifier 2 224, and classifier N 226. While classifiers typically comprise code or data from a cloud or other source, in some cases classifiers can be stored locally on the device. In embodiments, any number of classifiers is possible. The classifiers can be obtained from any of a variety of sources including by internet download, from an application vendor site, from user-developed code, and so on. Similarly, new classifiers can be obtained from a variety of sources. The classifiers in the API can be updated automatically.

Various communication channels can exist between an application and an API. For example, the application 210 can communicate with the API 220 via channel 230, and can receive a communication back from the API via the same channel or another channel, such as second channel 232. The API 220 can receive an initialization or another communication 230 from an application 210. The application can use delegation techniques for operations performed by the API and can include delegating a message from the API to an application. Delegation is a design pattern in software by which one entity relays a message to another entity, or performs an action based on the consent of the entity. An entity can be considered an instantiated object of a class within object-oriented environments. The API can perform various operations based on the initialization. The operations performed can include one of more of the classifiers 1 through N. Information on one or more emotional states can be returned using a channel 232 to the application 210.

The API 220 can use classifiers to process and analyze mental state data gathered from a user or users. In embodiments, the data is in the form of an image or video of the user or users. The image or video can be obtained from a variety of sources including one or more cameras 240, file systems 250, or cloud-based resources 260, and can be obtained using a variety of networking techniques including wired and wireless networking techniques. In embodiments, the images can be from a collection of photographs, an album, or some other grouping of images or videos. The application can pass parameters or information on the source of the video or images that contains mental state data to the API. Mental state information, when analyzed from the mental state data, can aid individuals in identifying emotional states and moods. In embodiments, the application, API, camera 240, and file system 250 reside on the same device.

Figure 3:
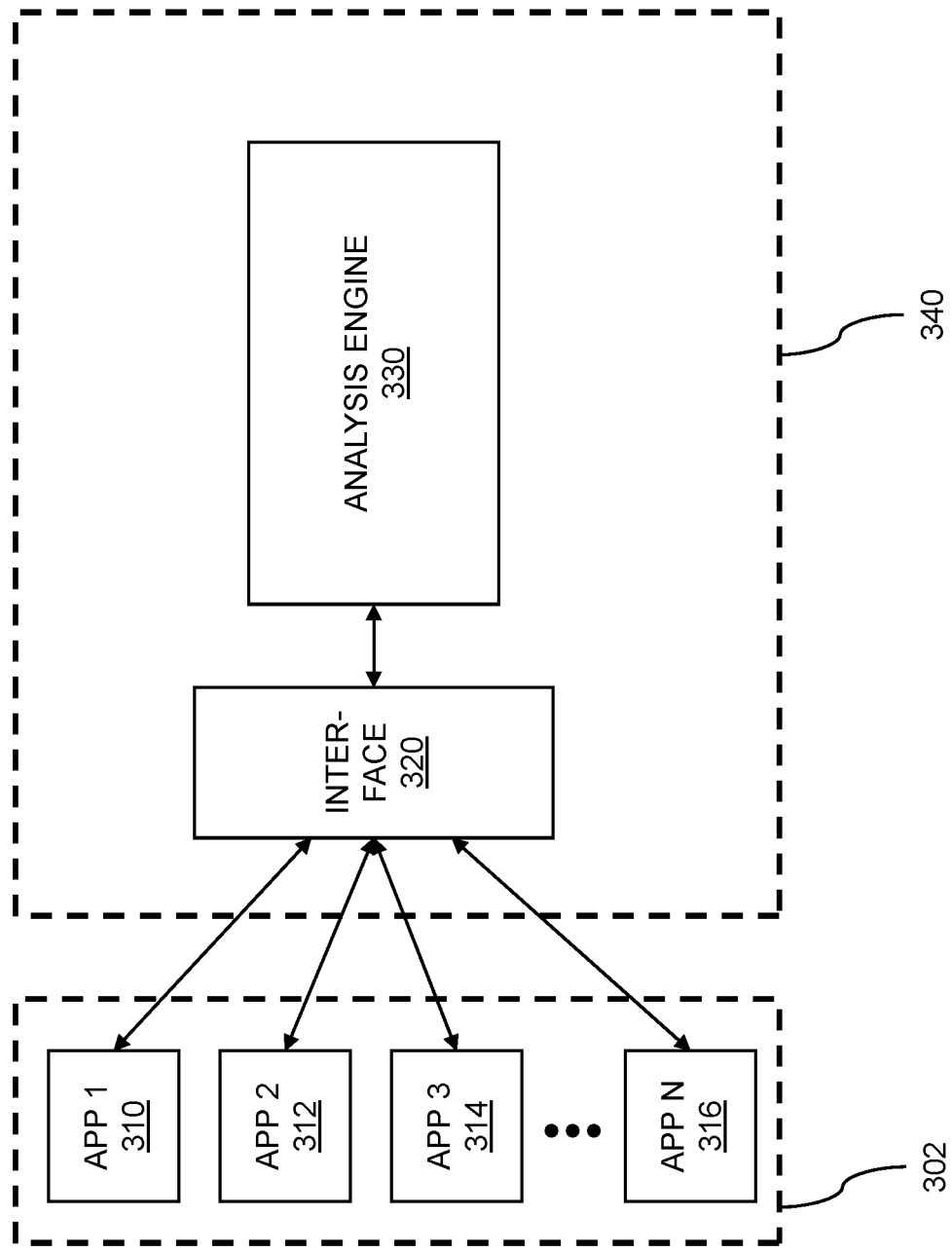
FIG. 3 is an example diagram of apps calling the API.

FIG. 3 is an example diagram of apps calling the API. In the example, one or more apps 302 call an API 340. The apps can reside on a device, where the device can be a portable device such as a laptop or ultra-mobile PC, a mobile device such as a smartphone or tablet, a wearable device such as glasses or a watch, and so on. In embodiments, the apps 302 and the API 340 can reside on the same device. The apps 302 can include a single app such as app 1 310. In some embodiments, the apps 302 comprise a plurality of applications, such as app 1 310, app 2 312, app 3 314, app N 316, and so on. The apps can comprise any of a variety of apps including social media apps. The API 340 provides emotional enablement to a device on which the API 340 resides. The user can choose to emotionally enable any number of apps loaded on her or his device. The one or more apps 302 can send video, images, raw data, or other user information to the API 340 for analysis. The images, video, user information, and the like, can be generated by the device, obtained by the device, loaded onto the device, and so on.

The API 340 can include an interface 320 for receiving raw data and for sending mental state data, mental state information, and emotional state information to and from the one or more apps 302. The raw data received by the interface 320 can include images, video, user information, etc. The interface can provide a variety of functions to assist communication between the apps and the analysis engine. The interface 320 can communicate with the one or more apps using any of a variety of techniques including wired networking using USB, Ethernet, etc., wireless networking using Wi-Fi, Bluetooth®, IR, etc., or another appropriate communication technique. The communications between the one or more apps and the interface can be unidirectional or bidirectional.

The API 340 includes analysis capabilities in the form of an analysis engine 330. In some embodiments, the API 340 also communicates with a web service. Analysis of the raw data can be performed on the device, on the web service, or on both. An app on a device can use delegation for analysis of data by the API. The raw data can include images, video, user information, and so on. In at least one embodiment, all of the analysis needed by the one or more apps 302 is performed on the device. The analysis engine 330 can analyze the image or video to determine one or more mental states, where the mental states can include one or more of stress, sadness, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, and curiosity. The analysis engine can determine one or more emotional states based on the mental state information.

Figure 4:
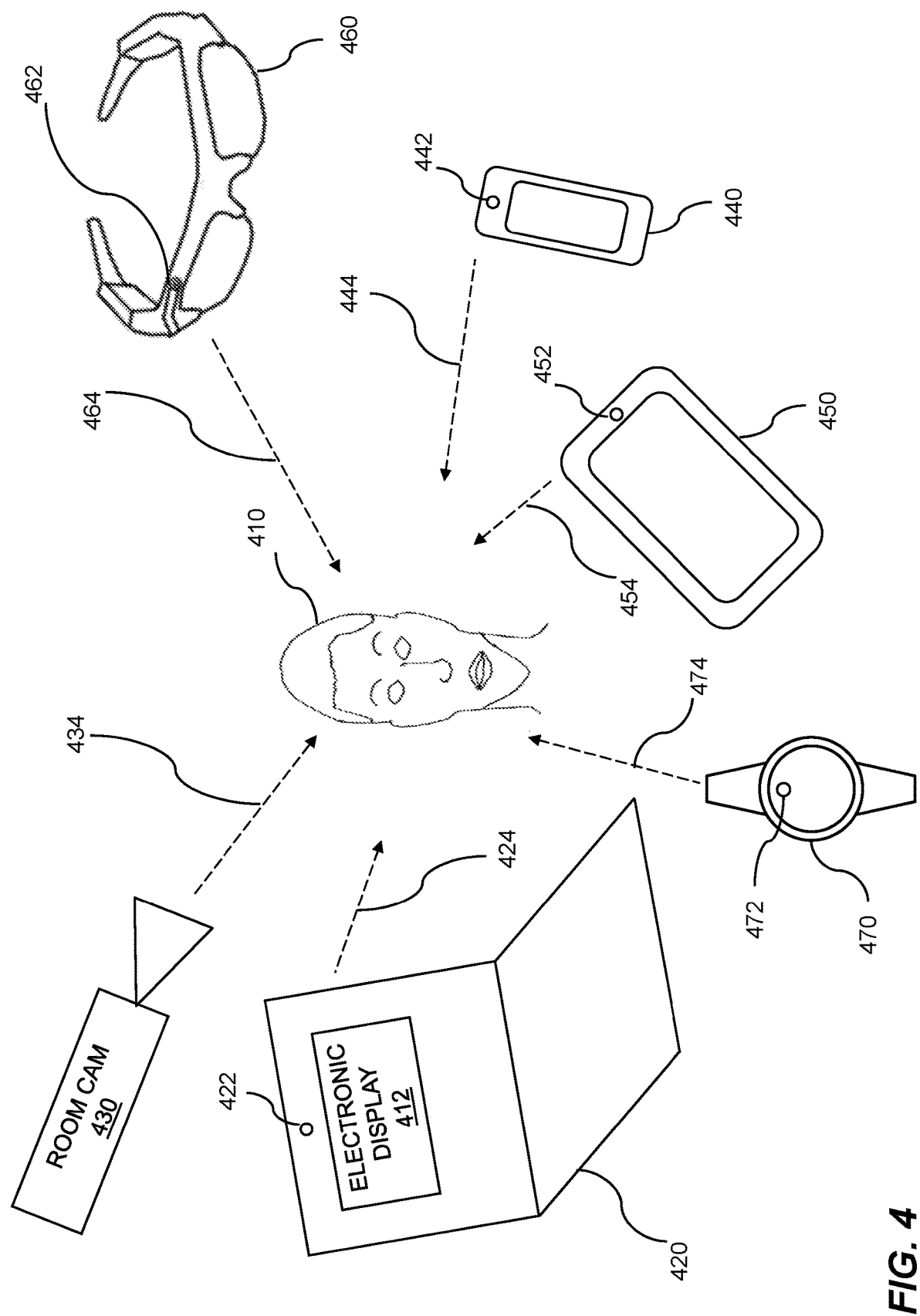
FIG. 4 is an example diagram showing collection of cognitive state data from multiple devices.

FIG. 4 is an example diagram showing collection of cognitive, emotional, or mental state data from multiple devices. One or more of the smart devices within FIG. 4 can have an API for emotionally enabling the device. Facial data can be collected from a plurality of sources and can be used for mental state analysis. In some cases, only one source can be used while in other cases multiple sources can be used. A user 410 can be performing a task, viewing a media presentation on an electronic display 412, or doing any activity where it can be useful to determine the user's mental state. The electronic display 412 can be on a laptop computer 420 as shown, a tablet computer 450, a cell phone 440, a desktop computer monitor, a television, or any other type of electronic device. The mental state data can be collected on a mobile device such as a cell phone 440, a tablet computer 450, or a laptop computer 420; a fixed device, such as the room camera 430; or a wearable device such as glasses 460 or a watch 470. Thus, the device can be a wearable device. Furthermore, the device can include an automobile, truck, motorcycle, or other vehicle and the mental state data can be collected by the vehicle or an apparatus mounted on or attached to the vehicle. The plurality of sources can include at least one mobile device such as a phone 440 or a tablet 450, or a wearable device such as glasses 460 or a watch 470. A mobile device can include a front-side camera and/or a back-side camera which can be used to collect video and/or image data.

As the user 410 is monitored, the user 410 can move due to the nature of the task, boredom, distractions, or for another reason. As the user moves, the user's face can be visible from one or more of the multiple sources. For example, if the user 410 is looking in a first direction, the line of sight 424 from the webcam 422 might be able to observe the individual's face, but if the user is looking in a second direction, the line of sight 434 from the room camera 430 might be able to observe the individual's face. Further, if the user is looking in a third direction, the line of sight 444 from the phone camera 442 might be able to observe the individual's face. If the user is looking in a fourth direction, the line of sight 454 from the tablet cam 452 might be able to observe the individual's face. If the user is looking in a fifth direction, the line of sight 464 from the wearable camera 462 might be able to observe the individual's face. If the user is looking in a sixth direction, the line of sight 474 from the wearable camera 472 might be able to observe the individual's face. Another user or an observer can wear the wearable device, such as the glasses 460 or the watch 470. In other embodiments, the wearable device is a device other than glasses, such as an earpiece with a camera, a helmet or hat with a camera, a clip-on camera attached to clothing, or any other type of wearable device with a camera or other sensor for collecting mental state data. The individual 410 can also wear a wearable device including a camera which can be used for gathering contextual information and/or collecting mental state data on other users. Because the individual 410 might move his or her head, the facial data can be collected intermittently when the individual is looking in a direction of a camera. In some cases, multiple people are included in the view from one or more cameras, and some embodiments include filtering out faces of one or more other people to determine whether the individual 410 is looking toward a camera.

In some embodiments, one of the devices can run an app that can use mental state analysis. An API can be running on the device for returning mental state analysis based on the images or video collected. In some cases, multiple devices can have APIs running on them for mental state analysis. In this situation the resulting analysis can be aggregated from the multiple devices after the APIs analyze the image information. In other situations, images from multiple devices are collected on one of the devices. The images are then processed through the API running on that device to yield mental state analysis.

Figure 5:
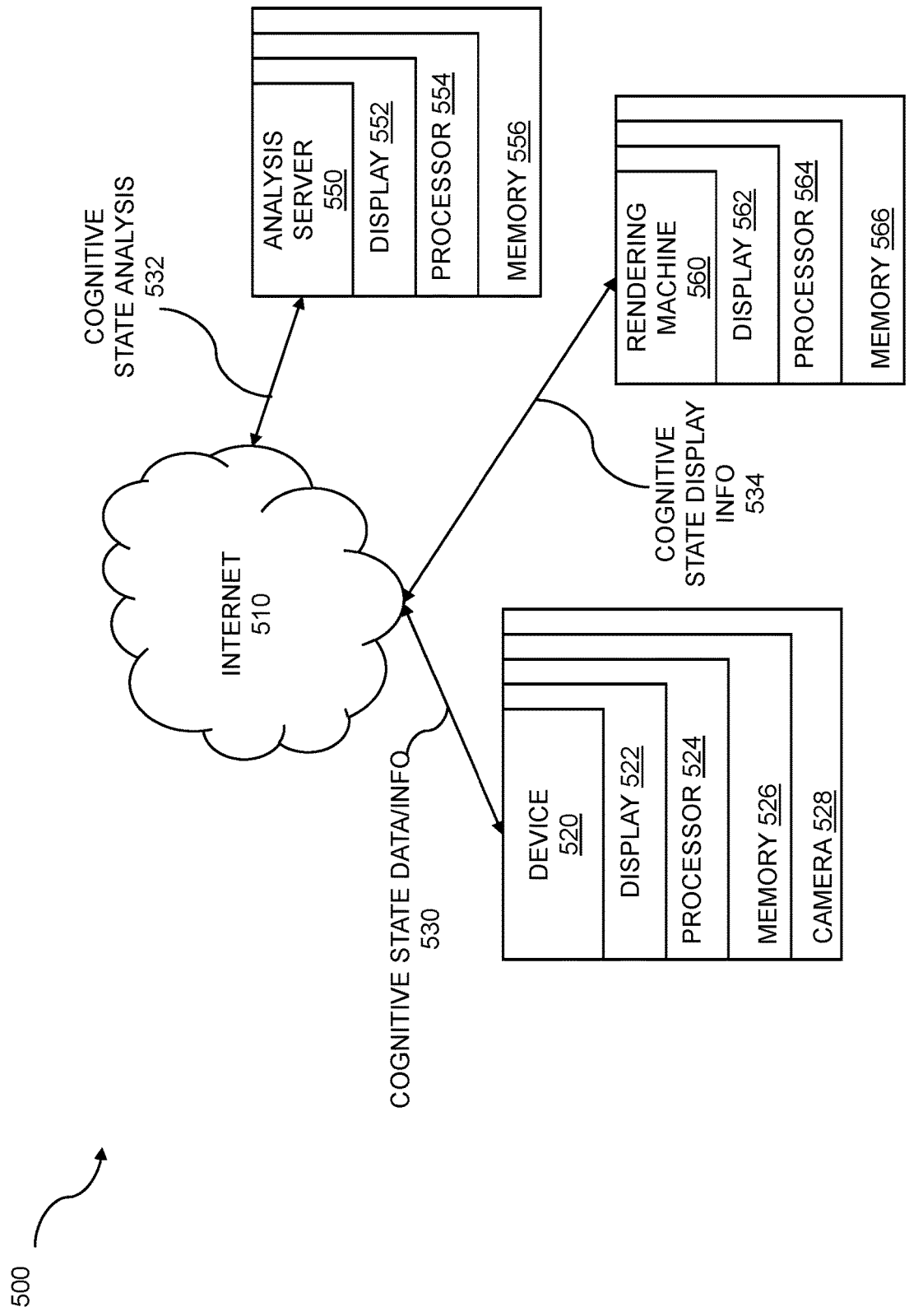
FIG. 5 is an example system that uses an API for cognitive state analysis.

FIG. 5 is an example system for using an API for cognitive state analysis. The example system 500 can be used for file system manipulation using machine learning. The diagram illustrates an example system 500 for emotional, mental, or cognitive state collection, analysis, and rendering. The system 500 can include one or more client machines or devices 520 linked to an analysis server 550 via the Internet 510 or some other computer network. A device 520 can include an API or SDK which provides for cognitive state analysis by apps on the device 520. The API can provide for mood evaluation for users of the device 520. An app can provide images to the API and the API can return cognitive state analysis. In the example 500 shown, the client device 520 comprises one or more processors 524 coupled to a memory 526 which can store and retrieve instructions, a display 522, and a camera 528. The memory 526 can be used for storing instructions, cognitive state data, cognitive state information, cognitive state analysis, and sales information. The display 522 can be any electronic display, including but not limited to, a computer display, a laptop screen, a netbook screen, a tablet computer screen, a cell phone display, a mobile device display, a remote with a display, a television, a projector, or the like. The camera 528 can comprise a video camera, still camera, thermal imager, CCD device, phone camera, three-dimensional camera, depth camera, multiple webcams used to show different views of a person, or any other type of image capture apparatus that can allow captured data to be used in an electronic system. The processors 524 of the client device 520 are, in some embodiments, configured to receive cognitive state data collected from a plurality of people to analyze the cognitive state data in order to produce cognitive state information. In some cases, cognitive state information can be output in real time (or near real time), based on cognitive state data captured using the camera 528. In other embodiments, the processors 524 of the client device 520 are configured to receive cognitive state data from one or more people, analyze the cognitive state data to produce cognitive state information and send the cognitive state information 530 to the analysis server 550.

The analysis server 550 can comprise one or more processors 554 coupled to a memory 556, which can store and retrieve instructions, and a display 552. The analysis server 550 can receive cognitive state data and analyze the cognitive state data to produce cognitive state information so that the analyzing of the cognitive state data can be performed by a web service. The analysis server 550 can use cognitive state data or cognitive state information received from the client device 520. The received data and other data and information related to cognitive states and analysis of the cognitive state data can be considered cognitive state analysis information 532. In some embodiments, the analysis server 550 receives cognitive state data and/or cognitive state information from a plurality of client machines and aggregates the cognitive state information.

In some embodiments, a rendering display of cognitive state analysis can occur on a different computer than the client device 520 or the analysis server 550. The different computer can be a rendering machine 560 which can receive cognitive state data 530, cognitive state analysis information, cognitive state information, and graphical display information collectively referred to as cognitive state display information 534. In embodiments, the rendering machine 560 comprises one or more processors 564 coupled to a memory 566, which can store and retrieve instructions, and a display 562. The rendering can be any visual, auditory, or other form of communication to one or more individuals. The rendering can include an email, a text message, a tone, an electrical pulse, or the like. The system 500 can include computer program product embodied in a non-transitory computer readable medium for cognitive state analysis comprising: code for obtaining images of an individual through a software interface on a device, code for evaluating the images to determine cognitive state data, code for analyzing cognitive state information based on the cognitive state data, and code for outputting the cognitive state information through the software interface. The computer program product can be part of an API that resides on a mobile device. The API can be accessed by an app running on a device to provide emotional enablement for the device.

Figure 6:
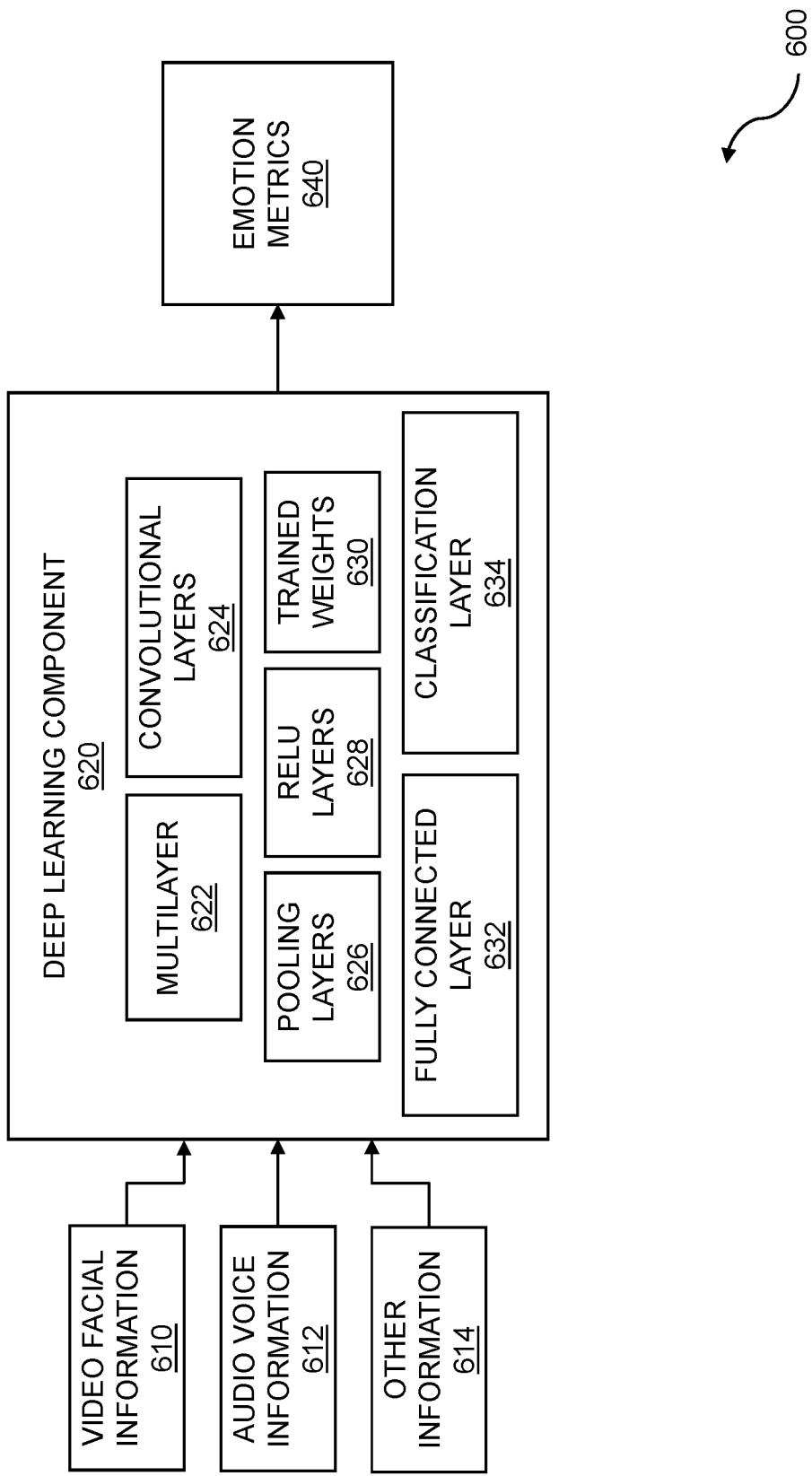
FIG. 6 illustrates a high-level diagram for machine learning/deep learning.

FIG. 6 illustrates a high-level diagram for deep learning. Deep learning, or machine learning, can be used to enable file system manipulation. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotion analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Understanding and evaluating moods, emotions, or mental states requires a nuanced evaluation of facial expressions, audio expressions, or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. FIG. 6 illustrates a high-level diagram for deep learning 600. The deep learning can be accomplished using a multilayered convolutional computing system, a convolutional neural network, or other techniques. The deep learning can accomplish image analysis, audio analysis, and other analysis tasks. A deep learning component 620 collects and analyzes various types of information from a plurality of information channels. The information channels can include video facial information 610, audio voice information 612, other information 614, and so on. In embodiments, the other information can include one or more of electrodermal activity, heart rate, heart rate variability, skin temperature, blood pressure, muscle movements, or respiration.

Returning to the deep learning component 620, the deep learning component can include a multilayered convolutional computing system 622. The multilayered convolutional computing system 622 can include a plurality of layers of varying types. The layers can include one or more convolutional layers 624 which can be used for learning and analysis. The convolutional layers can include pooling layers 626 which can combine the outputs of clusters into a single datum. The layers can include one or more Rectified Linear Unit (ReLU) layers 628. The one or more ReLU layers can implement an activation function such as $f(x)=\max(0,x)$, thus providing an activation with a threshold at zero. The convolutional layers can include trained weights 630. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 620 can include a fully connected layer 632. The fully connected layer 632 processes each data point from the output of a collection of intermediate layers. The fully connected layer 632 takes all data points in the previous layer and connects them to every single node contained within the fully connected layer. The output of the fully connected layer 632 can provide input to a classification layer 634. The classification layer can be used to classify emotional states, mental states, moods, and so on. The classification can be based on using classifiers. The deep learning component 620 provides data that includes emotion metrics 640. The emotion metrics can include an emotion type, a number of occurrences of the emotional type, the intensity of the emotional type, and so on. The emotion metric can be based on a threshold value, on a target value, on a goal, etc. The emotion metric can be based on emotion types that can occur over a period of time. More than one emotion metric can be provided.

Figure 7:
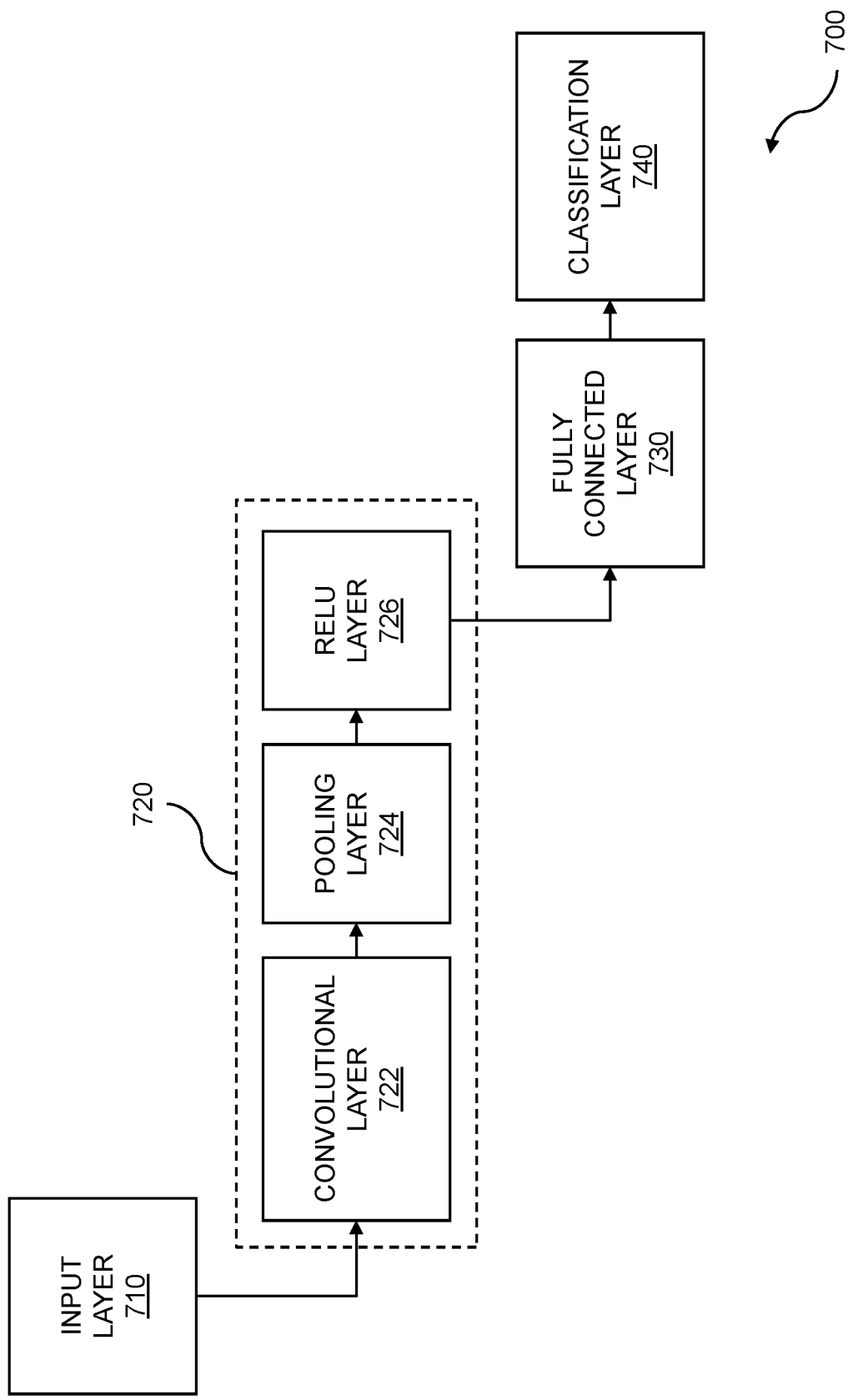
FIG. 7 is an example showing a convolutional neural network.

FIG. 7 is an example showing a convolutional neural network. A convolutional neural network can be used to enable file system manipulation. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotion analysis of the audio information and the video information. Further information is captured into a second computing device. The further information is analyzed using the trained weights to provide an emotion metric based on the further information.

Emotion analysis is a very complex task. Understanding and evaluating moods, emotions, or mental states requires a nuanced evaluation of facial expressions or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the mental state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal or control. Thus, by analyzing facial expressions en masse, important information regarding the mental state of the audience can be obtained.

Analysis of facial expressions is also a complex undertaking. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, physiological data, and so on. Facial data as contained in the raw video data can include information on one or more action units such as head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be obtained, where the physiological data can be obtained using a camera or other image capture device, without contacting the person or persons. Respiration, heart rate, heart rate variability, perspiration, temperature, and other physiological indicators of mental state can be determined by analyzing the images and video data.

Analysis of expressions emanating from human audio is also highly complex. Audio data can include speech, grunts, groans, shouts, screams, and so on. Further, the method of how the audio is produced can greatly influence the one or more expressions extracted from the audio. As a result, the audio data, such as voice data, can be evaluated for timbre, prosody, vocal register, vocal resonance, pitch, loudness, speech rate, language content, and so on. The evaluation results can be associated with mental states, emotional states, moods, and so on. For example, loud, rapid, shrill speech can indicate anger, while moderate, controlled speech including polysyllabic words can indicate confidence.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications can include image recognition, facial recognition, etc. Image data applications can include differentiating dogs from cats, identifying different human faces, and the like. The image data applications can include identifying moods, mental states, emotional states, and so on, from the facial expressions of the faces that are identified. Audio data applications can include analyzing audio input such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, mental states, emotional states, etc.

The artificial neural network which forms the basis for deep learning is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of mental state. The last layer of the convolutional neural network can be the final classification layer. The output of the final classification layer can be indicative of mental state of faces within the images that are provided to input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to next layer. Weights adjust the output of one layer as it is fed to the next layer. When the final layer is reached, the output of the final layer can be a facial expression, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward, from the input nodes, through the hidden nodes and on to the output nodes. Additionally, the weights can be updated during a backpropagation process through the multilayered analysis engine.

Returning to the figure, FIG. 7 illustrates a system diagram 700 for deep learning. The system for deep learning can be used for multimodal machine learning. The system for deep learning can be accomplished using a convolution neural network or other techniques. The deep learning can accomplish facial recognition and analysis tasks. The network includes an input layer 710. The input layer 710 receives image data. The image data can be input in a variety of formats, such as JPEG, TIFF, BMP, and GIF. Compressed image formats can be decompressed into arrays of pixels, wherein each pixel can include an RGB tuple. The input layer 710 can then perform processing such as identifying boundaries of the face, identifying landmarks of the face, extracting features of the face, and/or rotating a face within the plurality of images.

The network includes a collection of intermediate layers 720. The multilayered analysis engine can include a convolutional neural network. Thus, the intermediate layers can include a convolutional layer 722. The convolutional layer 722 can include multiple sublayers, including hidden layers within it. The output of the convolutional layer 722 feeds into a pooling layer 724. The pooling layer 724 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 724. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (ReLU) layer 726. The output of the pooling layer 724 can be input to the ReLU layer 726. In embodiments, the ReLU layer implements an activation function such as $f(x)$-max$(0,x)$, thus providing an activation with a threshold at zero. In some embodiments, the ReLU layer 726 is a leaky ReLU layer. In this case, instead of the activation function providing zero when x<0, a small negative slope is used, resulting in an activation function such as $f(x)=1(x<0)(\alpha x)+1(x>=0)(x)$. This can reduce the risk of "dying ReLU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 722 and one or more hidden layers, and wherein the multilayered analysis engine can be used for emotion analysis.

The example 700 includes a fully connected layer 730. The fully connected layer 730 processes each pixel/data point from the output of the collection of intermediate layers 720. The fully connected layer 730 takes all neurons in the previous layer and connects them to every single neuron it has. The output of the fully connected layer 730 provides input to a classification layer 740. The output of the classification layer 740 provides a facial expression and/or mental state as its output. Thus, a multilayered analysis engine such as the one depicted in FIG. 7 processes image data using weights, models the way the human visual cortex performs object recognition and learning, and provides effective analysis of image data to infer facial expressions and mental states.

Figure 8:
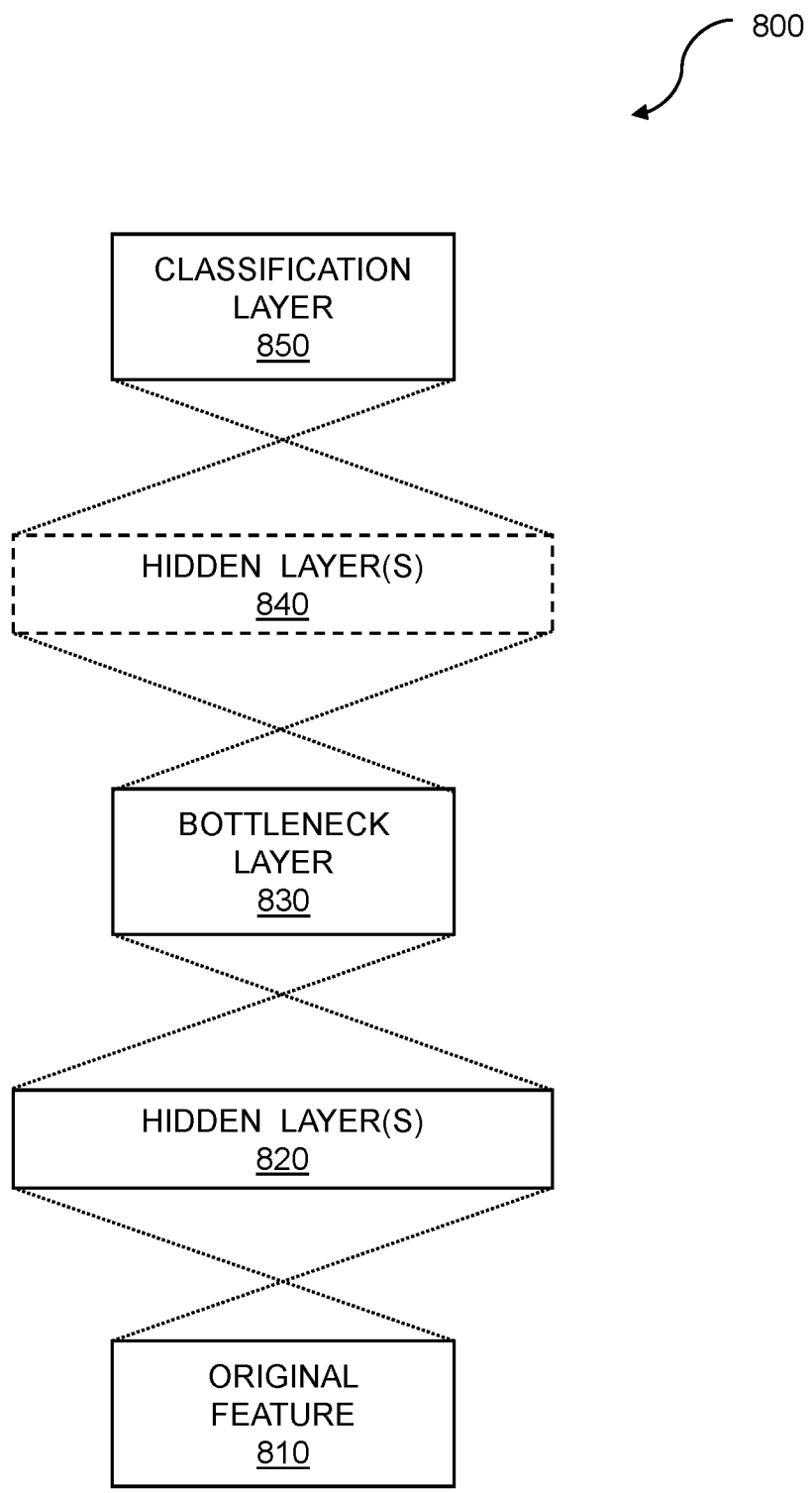
FIG. 8 illustrates a bottleneck layer within a deep learning environment.

FIG. 8 illustrates a bottleneck layer within a deep learning environment. A bottleneck layer can be a layer of a deep neural network and can be used to enable file system manipulation. A deep neural network can apply classifiers. For example, video data that includes images of one or more people can be obtained. Audio data that corresponds to the video data can also be obtained. A face can be identified within the video data, and a voice from the audio data can be associated with the face, to illustrate just one example of manipulation.

Layers of a deep neural network can include a bottleneck layer 800. A bottleneck layer can be used for a variety of applications such as facial recognition, voice recognition, emotional state recognition, and so on. The deep neural network in which the bottleneck layer is located can include a plurality of layers. The plurality of layers can include an original feature layer 810. A feature such as an image feature can include points, edges, objects, boundaries between and among regions, properties, and so on. The deep neural network can include one or more hidden layers 820. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 830. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 840. The number of hidden layers can include zero hidden layers, one hidden layer, a plurality of hidden layers, and so on. The hidden layers following the bottleneck layer can include more nodes than the bottleneck layer. The deep neural network can include a classification layer 850. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 9:
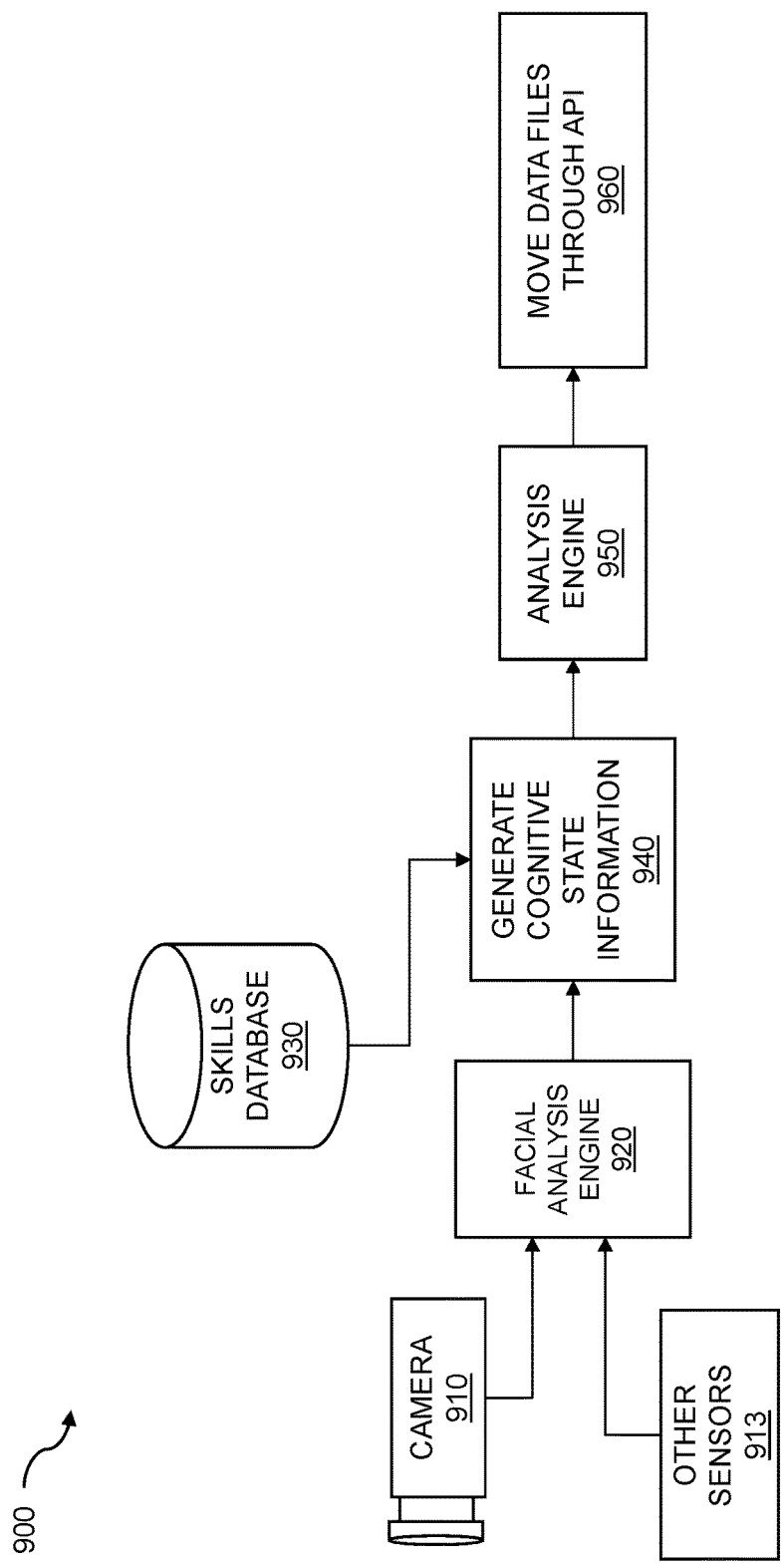
FIG. 9 illustrates a block diagram for image-based file system manipulation.

FIG. 9 illustrates a block diagram for image-based file system manipulation. The block diagram 900 includes a camera 910. The camera 910 can capture an image or a plurality of images. More than one camera can be used. The camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The camera 910 can be coupled to a facial analysis engine 920. Other sensors 913 can also be coupled to the analysis engine to augment facial analysis. The other sensors 913 could include biosensors evaluating electrodermal activity, heart rate, perspiration, respiration, blood sugar, and the like. The facial analysis engine can analyze an image from the plurality of images and can capture cognitive state data, where the cognitive state data can include facial data for the individual. The facial analysis engine 920 can be implemented using downloaded classifiers running under control of a connection data structure managed by an API. The facial analysis engine 920 can be coupled to a cognitive state information generator 940. The cognitive state information generator can generate the cognitive state information for an individual or a plurality of individuals. The cognitive state information generator can augment the facial analysis data from the facial analysis engine 920. The cognitive state information generator can be implemented on a machine learning system. The facial analysis engine 920 can calculate a facial expression metric associated with the facial data. The facial expression metric can be further analyzed to generate a cognitive state metric. All or part of the analysis can be performed on a neural network. The neural network can use classifiers to translate facial data into a cognitive state metric. The neural network can be integrated or partitioned over several devices, including a portable device such as a cell phone, a server that is local or remote, or a cloud service, to name just a few. The neural network can be part of a machine learning system. Some embodiments further include calculating a facial expression metric for the individual based on the classifying. Some embodiments further include generating a cognitive state metric for the individual based on the facial expression metric. And some embodiments further include the cognitive state metric in the translating.

Augmented information can be included in the analysis. The augmented information can include a voice, a context such as an environment, time and date, social information, news cycle information, and so on. The cognitive state information generator can be coupled to a skills database 930. The skills database 930 can include filtering information, temporal information, logical information, and so on. The cognitive state information generator can be coupled to an analysis engine 950. The analysis engine can be based on behavioral models. The analysis engine can generate instructions for moving data files through a connection data structure managed by an application programming interface. The data files can be based on the facial analysis and the cognitive state information that can be generated. The instructions from the analysis engine can enable moving data files through the API 960. The data files can thus be manipulated using machine learning.

Figure 10:
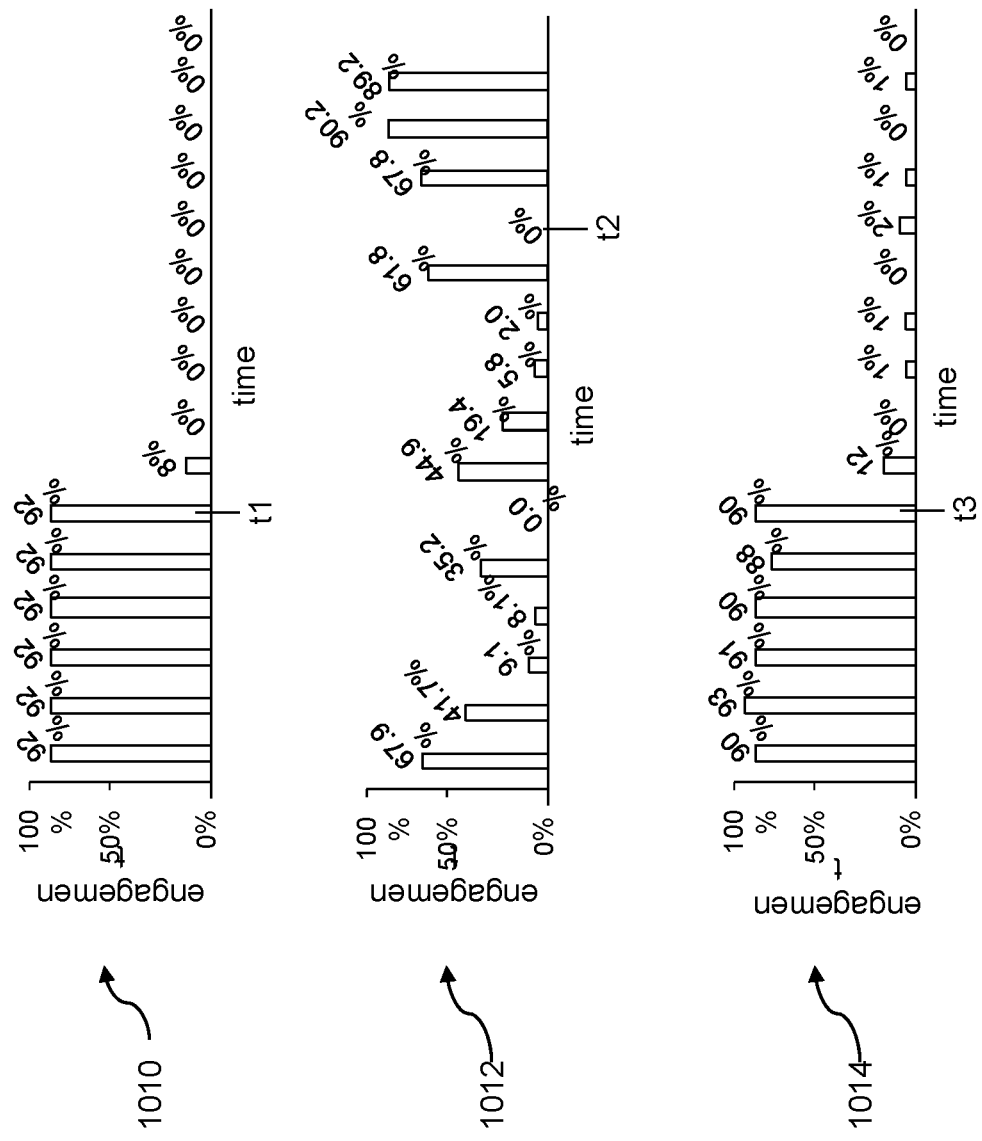
FIG. 10 is an example illustrating facial data that can be used to generate a cognitive state metric.

FIG. 10 is an example illustrating facial data that can be used to generate a cognitive state metric. FIG. 10 includes three charts, charts 1010, 1012, and 1014. Each chart has a horizontal axis of time, and a vertical axis of an engagement level, which may be derived from cognitive state data. In other embodiments, cognitive state data or other data derived from cognitive state data may be used to generate cognitive state metrics, such as measures of happiness, inattentiveness, concentration, and so on. Each bar on the chart may represent a time window comprising a fixed unit of time, such as one minute. In chart 1010, until time t1, the engagement level is at 92%, indicating that the user is mostly focused on the displayed content. After time t1, the next bar indicates a very low engagement level because at some point during that time window, the user left the area. In the subsequent time windows, the engagement level is zero, as the individual is no longer present.

In chart 1012, the individual remains present in front of the rendered content, but for a portion of the video, he frequently looks away. As can be seen in the chart 1012, up until time t2, the engagement level is sporadic, fluctuating between low and midrange levels. After time t2, the engagement level increases. In such an embodiment where digital media content is modified based on viewership, a chart such as 1012 indicates that the ending of the video is engaging to the individual, while earlier in the video, before time t2, the video was not as engaging. Thus, in embodiments, the modification includes shortening the video by deleting and/or shortening scenes of the video prior to time t2, in order to better hold the individual's attention and interest.

In chart 1014, the individual remains present in front of the rendered content, but for a portion of the video, he is frequently looking away by averting his gaze away from the screen that is presenting the media content. As can be seen in chart 1014, up until time t3, the engagement level is relatively high, indicating a high level of focus by the individual on the media content. After time t3, the engagement level significantly decreases. Each detected engagement level may be considered cognitive state data. In order to generate a cognitive state metric based on a chart such as 1014, the cognitive state data may be processed in any appropriate and desired fashion.

For example, groups of three sequential engagement levels may be averaged to produce cognitive state metrics for a plurality of time periods. As another example, all of the engagement levels for a given time period may be summed and divided by the number of engagement levels that are below 50% in order to determine a cumulative cognitive state metric. For example, in chart 1010, a cumulative cognitive state metric may be determined by summing all of the engagement levels (560) and dividing by the number of engagement levels below 50% (ten), resulting in a cumulative cognitive state metric of 560/10 or 56. For chart 1010, a cumulative cognitive state metric may be determined by summing all of the engagement levels (543.1) and dividing by the number of engagement levels below 50% (ten), resulting in a cumulative cognitive state metric of 543.1/10 or 54.31. For chart 1014, a cumulative cognitive state metric may be determined by summing all of the engagement levels (560) and dividing by the number of engagement levels below 50% (ten in chart 1014), resulting in a cumulative cognitive state metric of 56. Thus, if chart 1010 has a cumulative cognitive state metric of 56, chart 1012 has a metric of 54.31, and chart 1014 has a metric of 56, it may be determined that charts 1010 and 1014 indicate roughly equal levels of engagement while chart 1012 indicates slightly lower engagement than that shown by charts 1010 and 1014. As further examples, if a user is 100% engaged for 8 of 16 sample periods and 49% engaged for the remaining eight sample periods, the cumulative cognitive state metric may be calculated as 100, indicating more engagement than is shown in charts 1010, 1012, and 1014. However, if a user is only 80% engaged for 4 of 16 sample periods and 0% engaged for the remaining twelve sample periods, the cumulative cognitive state metric may be calculated as 26.67, indicating less engagement than is shown in charts 1010, 1012, and 1014. Although only a selection of cognitive state metrics is explicitly discussed herein, it will be understood after reviewing this application in its entirety that any number of different cognitive state metrics may be used.

Figure 11:
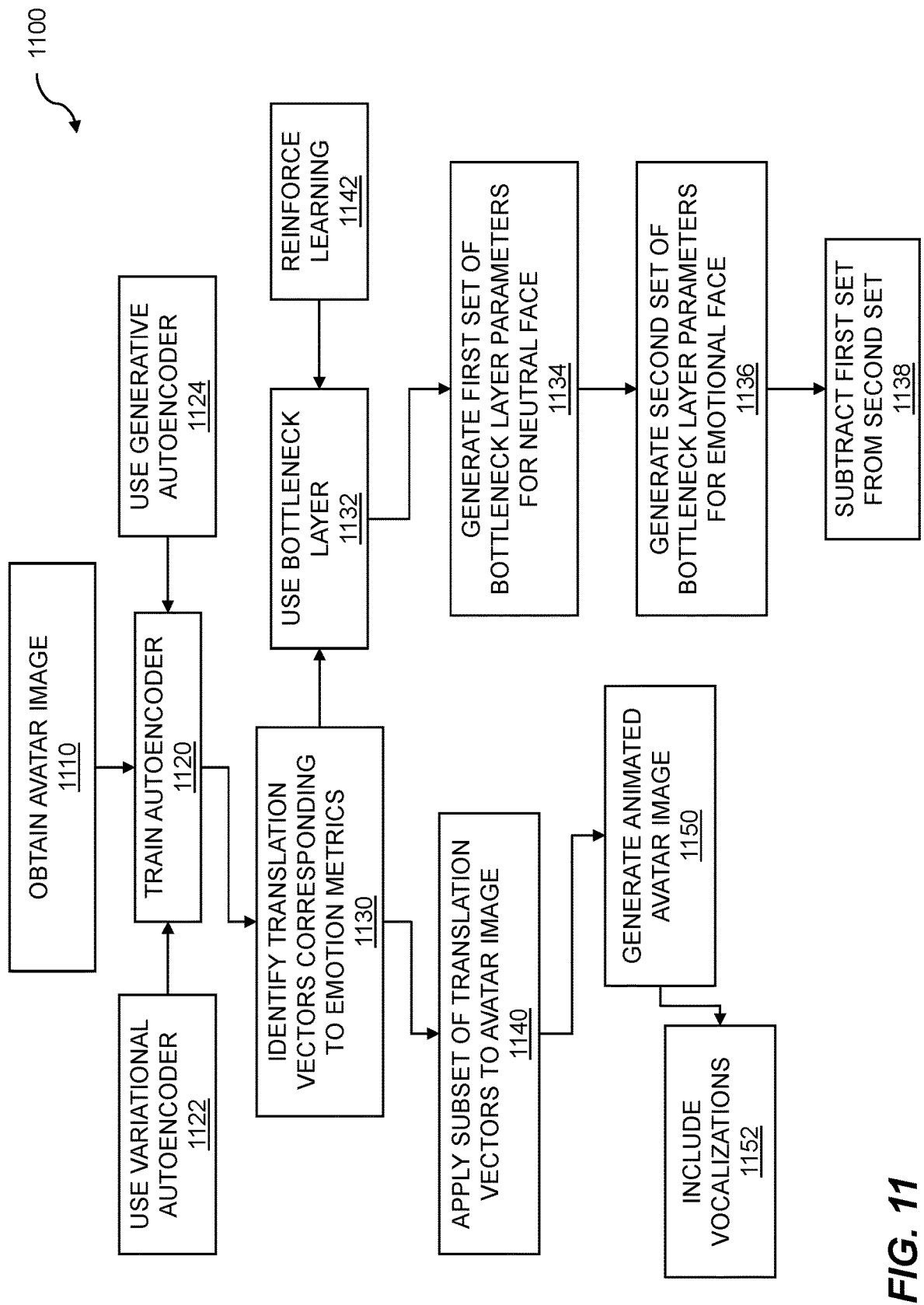
FIG. 11 is an example flow diagram for a machine learning application.

FIG. 11 is an example flow diagram for a machine learning application. The flow 1100 is an example of machine learning based image processing, in this case, avatar image processing, and includes obtaining an avatar image 1110 for representation on a first computing device. The avatar image can be based on one or more images of a person, a morphed image, and the like. The avatar image can be based on an emoji, an animated emoji, a cartoon, and so on. In embodiments, the avatar image can include a humanoid face. The humanoid face can be a simulated face, a cartoon face, a character face, and so on. In embodiments, the avatar image includes vocalizations. The vocalization can include speech vocalizations, non-speech vocalizations, etc. The first computing device can include a personal electronic device such as a smartphone, a personal digital assistant (PDA), and a tablet computer. The first computing device can include a wearable device such as a smart watch, smart glasses, a smart garment, etc. The first computing device can be a laptop computer, a desktop computer, etc. The flow 1100 incudes training an autoencoder 1120, on a second computing device comprising an artificial neural network, to generate synthetic emotive faces. The artificial neural network can include a convolutional neural network, a deep neural network, and so on. The second computing device can be similar to the first computing device or can be different from the first computing device. The second computing device can be a local server, a remote server, a blade server, a distributed server, a cloud server, and so on. Various types of autoencoders can be used. In embodiments, the training the autoencoder can include using a variational autoencoder 1122. In other embodiments, the training the autoencoder can include using a generative autoencoder 1124. In embodiments, the training is based on a plurality of facial videos of pre-catalogued facial emotion expressions.

The flow 1100 includes identifying a plurality of translation vectors corresponding to a plurality of emotion metrics 1130, based on the training. The translation vectors can be used to translate an avatar image, including a humanoid face, from one expression of an emotion to another expression of the same emotion or to a different emotion. The translation vectors can correspond to emotion metrics, where the emotion metrics can be used to determine one or more emotions, an intensity of an emotion, a duration of an emotion, and so on. The emotions can include happy, sad, angry, bored, and so on. In embodiments, the emotion metric input is obtained from facial analysis of an individual. The facial analysis can be based on one or more images captured from the individual. In embodiments, the facial expression is identified using a software development kit (SDK). The software development kit can be obtained from the provider of the animated avatar, from a third party, from shareware, and so on. In embodiments, the identifying the plurality of translation vectors uses a bottleneck layer 1132 within the autoencoder. The bottleneck layer can include a fewer number of nodes than the one or more preceding hidden layers in an artificial neural network. The bottleneck layer can create a constriction in the artificial neural network. The bottleneck layer can force information that is pertinent to a classification, for example, into a low dimensional representation. The flow 1100 can further include generating a first set of bottleneck layer parameters, from the bottleneck layer, learned for a neutral face 1134. The first set of bottleneck layer parameters can be used to identify characteristics of the neutral face. The characteristics of the neutral face can include lip position, eyelid position, and so on. The neutral face can be the humanoid face, a cartoon face, and so on. The flow 1100 further includes generating a second set of bottleneck layer parameters for an emotional face 1136. The second set of bottleneck layer parameters can be used for determining the one or more emotions of the emotional face. The second set of bottleneck layer parameters can be used to identify emotions based on non-speech vocalizations such as laughter, cries, sighs, squeals, yawns, grunts, clicks, filled pauses, unfilled pauses, and so on. The flow 1100 further includes subtracting the first set of bottleneck layer parameters from the second set of bottleneck layer parameters 1138 for use in the translation vectors. The subtracting the first set of bottleneck layer parameters from the second set of bottleneck layer parameters can be used to map the transition from the face with the neutral expression to the face with the emotional expression. The mapping can include intermediate steps between the neutral face and the emotional face so that the avatar animation can show the onset of the emotional face, variations of the emotional face such as head movement and blinking eyes, the decay of the emotional face, and so on.

The flow 1100 includes applying a subset of the plurality of translation vectors to the avatar image 1140, wherein the subset represents an emotion metric input. Many translation vectors can be identified in order to translate a neutral avatar face such as a humanoid face to an emotional avatar face. The emotional face can be derived from the neutral face by using a subset of the translation vectors. A happy face can result from using a subset of the translation vectors, a laughing face can result from using a subset of the translation vectors, and so on. The subsets of translation vectors may overlap or may not overlap, depending on the desired emotional face. The flow 1100 includes reinforcing learning 1142 of one or more bottleneck layers. Feedback can be provided, either manually or automatically, to further train a bottleneck layer based on responses from a person to a currently displayed avatar image.

The flow 1100 includes generating an animated avatar image 1150 for the first computing device, based on the applying, wherein the animated avatar image is reflective of the emotion metric input. The generated animated avatar image can be rendered on a screen coupled to the first computing device. The generated animated avatar image can be rendered in a program, an app, a webpage displayed in a web browser, and so on. The animated avatar can represent facial expressions of an individual. The individual can be the user of the first computing device. In embodiments, the avatar image includes body language. The body language can include body position, body orientation, body movement, and so on. In embodiments, the generating further includes vocalizations 1152 based on the emotion metric input. The vocalizations can include speech vocalizations, non-speech vocalizations, etc. Various steps in the flow 1100 may be changed in order, repeated, omitted, or the like without departing from the disclosed concepts. Various embodiments of the flow 1100 can be included in a computer program product embodied in a non-transitory computer readable medium that includes code executable by one or more processors.

Figure 12:
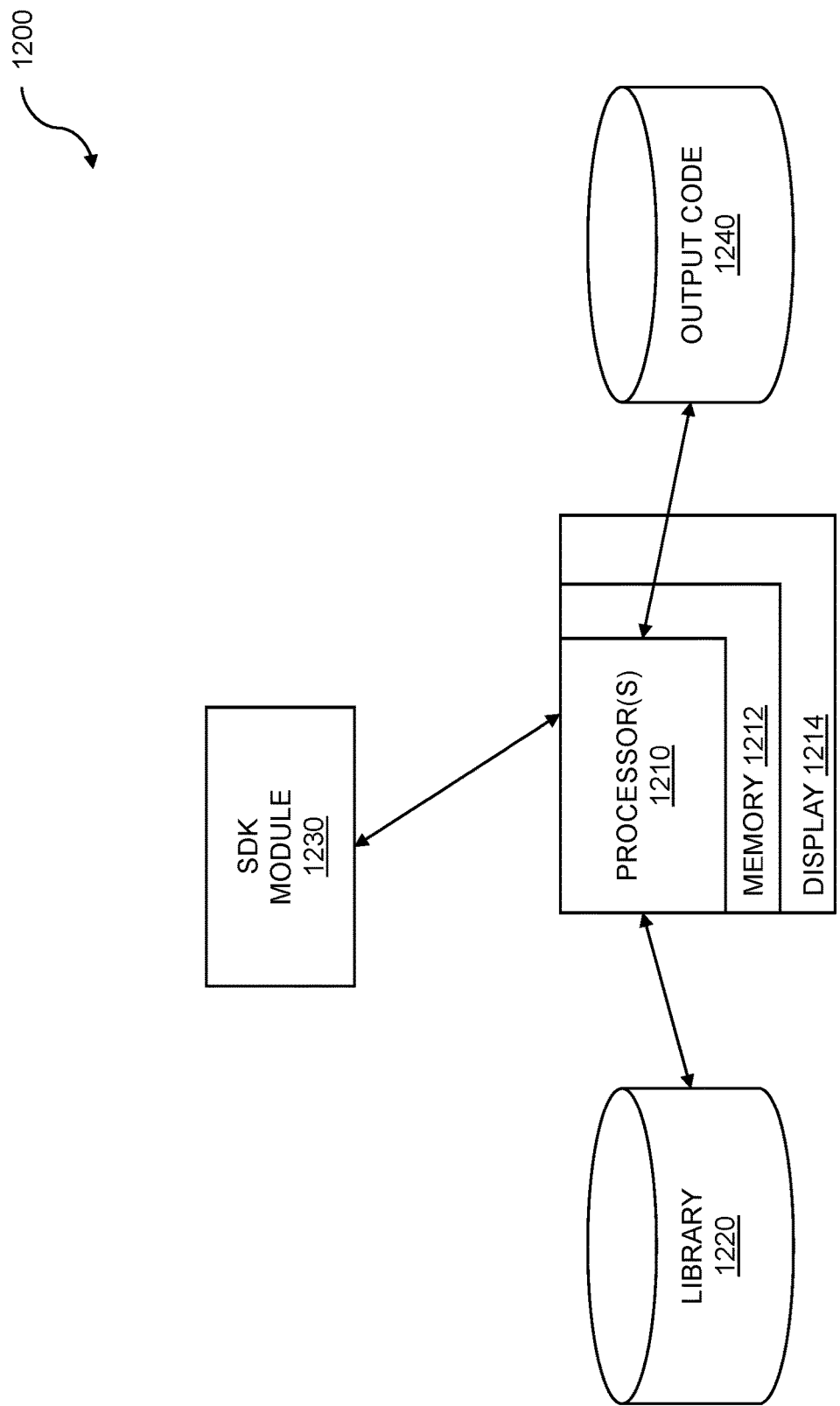
FIG. 12 is a system for file system manipulation using machine learning.

FIG. 12 is a system diagram for API generation. The system 1200 can include one or more processors 1210 coupled to memory 1212 to store instructions and/or data. A display 1214 can be included in some embodiments to show results to a user. The display 1214 can be any electronic display, including but not limited to, a computer display, a laptop screen, a netbook screen, a tablet computer screen, a cell phone display, a mobile device display, a remote with a display, a television, a projector, or the like. The system can include a non-transitory computer readable medium, such as a disk drive, flash memory, or another medium which can store code useful in API generation. The one or more processors 1210 can access a library 1220 that includes code or other information useful in API generation. In some embodiments, the library 1220 can be specific for a certain type device or operating system. The processors 1210 can access a software development kit (SDK) 1230 which can be useful for generating an API or other code which is output 1240. The API can provide for emotional enablement of devices on which the API is stored. The API can be accessed by one or more apps where the apps provide data for analysis and the API, in turn, can provide mental state analysis through file system manipulation using machine learning. The system 1200 can include a computer program product embodied in a non-transitory computer readable medium for generation of APIs. In at least one embodiment the SDK module function is accomplished by the one or more processors 1210.

In embodiments, the system 1200 can comprise computer system for file system manipulation comprising: a memory which stores instructions; one or more processors coupled to the memory wherein the one or more processors, when executing the instructions which are stored, are configured to: access a machine learning system; structure a connection between a file system and an application, wherein the connection is managed through an application programming interface (API), wherein the connection that is structured provides: two-way data transfer through the API between the application and the file system; distribution of one or more data files through the API; and enablement of processing of the one or more data files, using classifiers running on the machine learning system, wherein the one or more data files comprise images of an individual; determine cognitive state data based on the processing of the one or more data files; and output a result from the determining, through the connection that was structured. Some embodiments include a computer program product embodied in a non-transitory computer readable medium for file system manipulation, the computer program product comprising: accessing a machine learning system; structuring a connection between a file system and an application, wherein the connection is managed through an application programming interface (API), wherein the connection that is structured provides: two-way data transfer through the API between the application and the file system; distribution of one or more data files through the API; and enablement of processing of the one or more data files, using classifiers running on the machine learning system, wherein the one or more data files comprise images of an individual; determining cognitive state data based on the processing of the one or more data files; and outputting a result from the determining, through the connection that was structured.

Each of the above methods may be executed on one or more processors on one or more computer systems. Embodiments may include various forms of distributed computing, client/server computing, and cloud-based computing. Further, it will be understood that for each flowchart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which implementations may be generally referred to herein as a "circuit," "module," or "system."

A programmable apparatus that executes any of the above-mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer-implemented method for file system manipulation comprising:
   accessing a machine learning system, wherein the machine learning system comprises a deep learning component, wherein the deep learning component comprises a multilayered convolutional computing system;
   structuring a connection between a file system and an application, wherein the connection is managed through an application programming interface (API), wherein the connection that is structured provides:
      two-way data transfer through the API between the application and the file system;
      distribution of one or more data files through the API; and
      enablement of processing of the one or more data files, using classifiers running on the machine learning system, wherein the one or more data files comprise images of an individual;
   determining cognitive state data based on the processing of the one or more data files;
   determining a plurality of emotion metrics based on an output of the deep learning component;
   receiving a connection request, through the interface, for images and mental state information, wherein the connection request includes a connection data structure that includes a route to the images from the application, wherein the route defines a path that includes direct access to an image capture device;
   outputting a result from the determining of cognitive state data and the plurality of emotion metrics, through the connection that was structured;
   identifying a plurality of translation vectors corresponding to the plurality of emotion metrics;
   applying a subset of the plurality of translation vectors to an avatar image, wherein the subset represents an emotion metric input;
   generating an avatar image, wherein the avatar image includes a neutral avatar face; and
   translating the neutral avatar face to an emotional avatar face, based on the subset of the plurality of avatar images.

2. The method of claim 1 further comprising analyzing the cognitive state data to produce cognitive state information.

3. The method of claim 1 wherein the connection request comes from a peer component.

4. The method of claim 3 wherein the peer component is also running on the same device as the application programming interface.

5. The method of claim 1 wherein the connection data structure describes a format for the images.

6. The method of claim 1 further comprising receiving a connection data structure for the connection request where the connection data structure describes a format for the mental state information.

7. The method of claim 1 wherein the interface exposes one or more analyzing functions for mental state data to the application.

8. The method of claim 1 wherein the application programming interface is generated by a software development kit (SDK).

9. The method of claim 8 wherein the software development kit is for a device obtaining images.

10. The method of claim 9 wherein the software development kit runs on a different system from the device.

11. The method of claim 1 wherein the data files are images collected from a video of an individual.

12. The method of claim 1 wherein the machine learning enables inferring cognitive states from data files processed by the classifiers.

13. The method of claim 1 further comprising downloading the classifiers from a web service to a device.

14. The method of claim 13 wherein the classifiers that were downloaded are based on processing capability of the device.

15. The method of claim 13 further comprising updating one or more of the classifiers.

16. The method of claim 1 further comprising connecting to multiple applications in order to process data files from the multiple applications.

17. The method of claim 16 wherein the multiple applications are each running on different devices.

18. The method of claim 1 wherein the data files represent images for a plurality of people.

19. The method of claim 1 wherein images are retrieved from the file system connected through the interface.

20. The method of claim 19 wherein the file system is network-connected to the application through the interface.

21. The method of claim 1 further comprising calculating a facial expression metric for an individual based one or more of the classifiers.

22. The method of claim 21 further comprising generating a cognitive state metric for the individual based on the facial expression metric.

23. A computer program product embodied in a non-transitory computer readable medium for file system manipulation, the computer program product comprising:
    accessing a machine learning system, wherein the machine learning system comprises a deep learning component, wherein the deep learning component comprises a multilayered convolutional computing system;
    structuring a connection between a file system and an application, wherein the connection is managed through an application programming interface (API), wherein the connection that is structured provides:
        two-way data transfer through the API between the application and the file system;
        distribution of one or more data files through the API; and
        enablement of processing of the one or more data files, using classifiers running on the machine learning system, wherein the one or more data files comprise images of an individual;
    determining cognitive state data based on the processing of the one or more data files;
    determining a plurality of emotion metrics based on an output of the deep learning component;
    receiving a connection request, through the interface, for images and mental state information, wherein the connection request includes a connection data structure that includes a route to the images from the application, wherein the route defines a path that includes direct access to an image capture device;
    outputting a result from the determining of cognitive state data and the plurality of emotion metrics, through the connection that was structured;
    identifying a plurality of translation vectors corresponding to the plurality of emotion metrics;
    applying a subset of the plurality of translation vectors to an avatar image, wherein the subset represents an emotion metric input;
    generating an avatar image, wherein the avatar image includes a neutral avatar face; and
    translating the neutral avatar face to an emotional avatar face, based on the subset of the plurality of avatar images.

24. A computer system for file system manipulation comprising:
    a memory which stores instructions;
    one or more processors coupled to the memory wherein the one or more processors, when executing the instructions which are stored, are configured to:
        access a machine learning system, wherein the machine learning system comprises a deep learning component, wherein the deep learning component comprises a multilayered convolutional computing system;
        structure a connection between a file system and an application, wherein the connection is managed through an application programming interface (API), wherein the connection that is structured provides:
            two-way data transfer through the API between the application and the file system;
            distribution of one or more data files through the API; and
            enablement of processing of the one or more data files, using classifiers running on the machine learning system, wherein the one or more data files comprise images of an individual;
    determine cognitive state data based on the processing of the one or more data files;
    determine a plurality of emotion metrics based on an output of the deep learning component;
    receive a connection request, through the interface, for images and mental state information, wherein the connection request includes a connection data structure that includes a route to the images from the application, wherein the route defines a path that includes direct access to an image capture device;
    output a result from the determining of cognitive state data and the plurality of emotion metrics, through the connection that was structured;
    identify a plurality of translation vectors corresponding to the plurality of emotion metrics;
    apply a subset of the plurality of translation vectors to an avatar image, wherein the subset represents an emotion metric input;
    generate an avatar image, wherein the avatar image includes a neutral avatar face; and
    translate the neutral avatar face to an emotional avatar face, based on the subset of the plurality of avatar images.

25. The method of 1 wherein the generating an avatar image further includes vocalizations based on the emotion metrics.

* * * * *